United States Patent
Kida

(10) Patent No.: US 10,425,560 B2
(45) Date of Patent: Sep. 24, 2019

(54) IMAGE PROCESSING SENSOR

(71) Applicant: Keyence Corporation, Osaka (JP)

(72) Inventor: Daisuke Kida, Osaka (JP)

(73) Assignee: Keyence Corporation, Osaka (JP)

( * ) Notice: Subject to any disclaimer, the term of this patent is extended or adjusted under 35 U.S.C. 154(b) by 258 days.

(21) Appl. No.: 15/585,179

(22) Filed: May 3, 2017

(65) Prior Publication Data
US 2017/0346996 A1 Nov. 30, 2017

(30) Foreign Application Priority Data

May 27, 2016 (JP) ................................. 2016-106638

(51) Int. Cl.
| | |
|---|---|
| H04N 5/225 | (2006.01) |
| G06T 7/73 | (2017.01) |
| G06T 7/00 | (2017.01) |
| H04N 5/232 | (2006.01) |
| G03B 17/02 | (2006.01) |
| G03B 17/55 | (2006.01) |
| G03B 43/00 | (2006.01) |

(52) U.S. Cl.
CPC .......... *H04N 5/2252* (2013.01); *G03B 17/02* (2013.01); *G03B 17/55* (2013.01); *G03B 43/00* (2013.01); *G06T 7/001* (2013.01); *G06T 7/74* (2017.01); *H04N 5/2253* (2013.01); *H04N 5/2256* (2013.01); *H04N 5/23293* (2013.01); *G06T 2207/10004* (2013.01); *G06T 2207/20081* (2013.01); *G06T 2207/30164* (2013.01)

(58) Field of Classification Search
CPC .. H04N 5/2252; H04N 5/2253; H04N 5/2256; H04N 5/23293; G06T 7/74; G06T 7/001; G06T 2207/10004; G06T 2207/30164; G06T 2207/20081; G03B 17/55; G03B 43/00; G03B 17/02
See application file for complete search history.

(56) References Cited

U.S. PATENT DOCUMENTS

2007/0147830 A1* 6/2007 Amatatsu ............. H04N 5/2251
396/535
2016/0267647 A1* 9/2016 Higo ..................... G06T 7/0004

FOREIGN PATENT DOCUMENTS

JP   2013-109508   6/2013

* cited by examiner

Primary Examiner — Tat C Chio
(74) Attorney, Agent, or Firm — Kilyk & Bowersox, P.L.L.C.

(57) ABSTRACT

An image processing sensor which enables users to perform a setting operation accurately and easily while confirming an image of a target object is provided.
The image processing sensor has a configuration in which a power supply board, an illumination substrate, a main substrate, an imaging substrate, and a display substrate are housed in an internal space of a casing. The casing includes a first casing member, a second casing member, and a coupling casing member. The coupling casing member is interposed between the first casing member and the second casing member.

13 Claims, 19 Drawing Sheets

IMAGE PROCESSING SENSOR

CROSS-REFERENCE TO RELATED APPLICATIONS

The present application claims foreign priority based on Japanese Patent Application No. 2016-106638, filed May 27, 2016, the contents of which is incorporated herein by reference.

BACKGROUND OF THE INVENTION

1. Field of the Invention

The present invention relates to an image processing sensor.

2. Description of Related Art

In factory production lines, image processing sensors are used for determining presence or absence of positional deviation or defects of target objects that are conveyed by a belt conveyor or the like (For example, see JP-A-2013-109508).

In an image processing device described in JP-A-2013-109508, a plurality of light-emitting elements and a camera module are integrally housed in a single case. Lights are emitted from the plurality of light-emitting elements to a target object, and the target object is imaged by the camera module. Based on an image acquired by imaging, pass/fail determination of the corresponding target object is performed.

The image processing device described above requires users to set up criteria for the pass/fail determination of the target objects, for example. In this case, the users may set up the criteria easily and accurately only by confirming actually acquired images while observing the target object.

Accordingly, a configuration of the image processing device provided with a display unit such as a liquid crystal display panel or an organic EL (electroluminescence) panel is conceivable.

Generally, however, the display unit described above that displays images does not have high heat resistance. Therefore, when heat generated by the plurality of light-emitting elements and the camera module is transferred to the display unit, a normal operation of the display unit may be impaired.

SUMMARY OF THE INVENTION

It is an object of the invention to provide an image processing sensor which enables users to perform a setting operation accurately and easily, and also to confirm images of target objects.

(1) The invention provides an image processing sensor including: an illumination unit that illuminates a target object; an imaging unit that images the target object illuminated by the illumination unit; a display unit that displays an image of the target object acquired by the imaging unit; and a casing having an internal space that houses the illumination unit, the imaging unit, and the display unit, wherein pass/fail determination of the target object is performed by processing the image of the target objects acquired by the imaging unit, in which the casing includes:

a first casing member having a bottom portion and a first side surface that extends in a direction substantially orthogonal to the bottom portion so as to surround an outer peripheral edge portion of the bottom portion, and housing the illumination unit and the imaging unit;

a second casing member provided with a display window that allows visual check of a display screen of the display unit from outside; and a third casing member having a second side surface that extends in a direction substantially orthogonal to the bottom portion of the first casing member, in which the second side surface of the third casing member is coupled to an upper surface of the first side surface of the first casing member, in which the second casing member is coupled to an upper surface of the second side surface of the third casing member, in which the third casing member includes a space partitioning portion formed substantially parallel to the bottom portion of the first casing member so as to divide the internal space into two parts; a first space portion that houses the illumination unit and the imaging unit and a second space portion that houses the display unit, and in which a heat conductivity of each of the second side surface of the third casing member and the space partitioning portion is lower than a heat conductivity of the first casing member.

In the image processing sensor, the target object illuminated by the illumination unit is imaged by the imaging unit. An image of the target object acquired by imaging is displayed on the display unit. By processing the acquired image of the target object, pass/fail determination is performed on the target object.

When the illumination unit and the imaging unit are in operation, the illumination unit and the imaging unit generate heat. The illumination unit and the imaging unit are housed in the first casing member. Therefore, part of the heat generated by the illumination unit and the imaging unit is transferred to the first casing member. The first casing member and the second casing member are coupled via the second side surface of the third casing member having a low heat conductivity. Therefore, major part of the heat transferred from the illumination unit and the imaging unit to the first casing member is dissipated to an external space of the casing without being transferred to the third casing member.

Furthermore, in the internal space of the casing, the illumination unit and the imaging unit are housed in the first space portion. Therefore, part of the heat generated by the illumination unit and the imaging unit is dissipated in the first space portion of the internal space. Consequently, a temperature of an atmosphere in the first space portion rises due to the heat generated by the illumination unit and the imaging unit. In such a case as well, the internal space of the casing is partitioned by the space partitioning portion of the third casing member, which has a low heat conductivity. Accordingly, an amount of heat transferred from the atmosphere in the first space portion to the atmosphere in the second space portion is reduced, and thus the temperature rise of the atmosphere in the second space portion is restricted. Therefore, the amount of heat transferred from the illumination unit and the imaging unit to the display unit via the atmosphere in the internal space is reduced.

With the configuration as described above, the amount of heat transferred from the illumination unit and the imaging unit to the display unit via the first casing member, the third casing member, and the second casing member, and the amount of heat transferred from the illumination unit and the imaging unit to the display unit via the internal space are both reduced. Therefore, even though the display unit does not have high heat resistance, the display unit is prevented from malfunctioning due to the influence of heat generated by the illumination unit and the imaging unit. The users are allowed to check images displayed on the display screen of the display unit visually through the display window of the second casing member. Consequently, the users are allowed to perform a setting operation such as setting of pass/fail determination criteria of the target objects, and also to confirm the images of the target objects accurately and easily.

With the configuration described above, since the amount of heat transferred from the illumination unit and the imaging unit to the display unit is reduced, the casing does not have to be upsized for securing heat dissipating properties. Therefore, miniaturization of the image processing sensor is enabled.

The above-described "a heat conductivity of each of the second side surface and the space partitioning portion of the third casing member is lower than a heat conductivity of the first casing member" may also be referred to as "a heat resistance value of each of the second side surface and the space partitioning portion of the third casing member per unit distance is higher than a heat resistance value of the first casing member per unit distance".

(2) The space partitioning portion may divide and partition a space defined inside the annular second side surface into two parts in a vertical direction.

In this case, part of the first space portion and part of the second space portion are formed inside the second side surface of the third casing member. Accordingly, the internal space of the third casing member may be used as a space for disposing one or more components. Therefore, flexibility in design of the image processing sensor is improved.

(3) A cross section of the first side surface that extends along a direction parallel to the bottom portion of the first casing member may have substantially the same shape as a cross section of the second side surface that extends along the direction parallel to the bottom portion of the first casing member.

With the configuration described above, since the cross section of the first side surface has substantially the same shape as the cross section of the second side surface, the second side surface may be coupled easily to an upper surface of the first side surface. Therefore, the image processing sensor may be manufactured easily.

(4) The space partitioning portion may be formed integrally with the second side surface with a material of the same type as the second side surface. In this case, the number of components of the image processing sensor is reduced.

(5) The space partitioning portion may have a cable opening which allows insertion of a cable for transmitting an image signal for displaying the image acquired by the imaging unit on the display unit.

In this configuration, a display state of the display unit housed in the second space portion may be controlled from the first space portion while reducing the amount of heat transferred between the first space portion and the second space portion.

(6) The display unit may be provided on a lower surface of the second casing member.

In this configuration, the display unit is protected by the casing, and miniaturization of the image processing sensor is enabled.

(7) A thickness of a part of the second side surface of the third casing member may be smaller than a thickness of the other parts of the second side surface.

In this configuration, heat is less likely to be transferred in the thinner portions of the second side surface of the third casing member than other portions thereof. Therefore, the amount of heat to be transferred from the first casing member to the second casing member through the second side surface of the third casing member is further reduced. Accordingly, the temperature rise of the display unit is further prevented.

The term "thickness" used in this specification may be referred to also as "cross-sectional area" with respect to a direction of heat transfer. In other words, the cross-sectional area of part of the third casing member may be smaller than the cross-sectional area of other portions of the third casing member. By reducing the cross-sectional area, heat resistance value is increased, and thus heat is less likely to be transferred.

(8) An outer peripheral surface of the first side surface of the first casing member and an outer peripheral surface of the second side surface of the third casing member may constitute an outer peripheral surface of the casing.

In this configuration, major part of heat transferred from the illumination unit and the imaging unit to the first casing member is dissipated from the outer peripheral surface of the first side surface to the external space of the casing. Reminder of the heat transferred from the illumination unit and the imaging unit to the first casing member is transferred to the third casing member, and is dissipated from the outer peripheral surface of the second side surface to the external space of the casing. Therefore, the amount of heat transferred from the first casing member to the second casing member through the third casing member is further reduced.

(9) A first light-transmitting portion that transmits light emitted from the illumination unit and a second light-transmitting portion that transmits light incoming into the imaging unit may be provided on the bottom portion of the first casing member.

In this configuration, the image processing sensor is disposed so that the bottom portion of the first casing member faces the target object, so that the light emitted from the illumination unit illuminates the target object, and the illuminated target object is imaged by the imaging unit. In this state, the users are allowed to visually check the display unit through the display window of the second casing member. Therefore, convenience of the image processing sensor is improved.

(10) The first casing member includes a mounting surface for mounting the image processing sensor on a flat installation surface, an upper end portion of the second side surface may be formed being offset inward with respect to the mounting surface of the first casing member so that at least the upper end portion of the second side surface is disposed at a position separate from the installation surface when the first casing member is mounted on the installation surface via the mounting surface thereof.

In this configuration, in a state in which the first casing member is mounted on the installation surface, an outer surface of the second casing member is out of contact with the installation surface via the mounting surface thereof. Accordingly, heat transferred from the illumination unit and the imaging unit to the first casing member is prevented from being transferred to the second casing member through the installation surface.

(11) A first fastening member that fastens the first casing member and the third casing member, and a second fastening member that fastens the second casing member and the third casing member are provided, and the first fastening member and the second fastening member may be provided at such positions that the both contact each other.

In the configuration described above, the first casing member and the first fastening member come into contact with each other. Therefore, part of heat transferred from the illumination unit and the imaging unit to the first casing member is transferred to the first fastening member. In such a case as well, since the first fastening member and the second fastening member are out of contact with each other, transfer of the heat transferred to the first fastening member to the second fastening member is restricted. As a result, the heat is prevented from being transferred from the first casing member to the second casing member via the first and second fastening members.

The first fastening member is a metallic screw member, and the first casing member is provided with a screw hole into which the screw member fits, and a distance from a head of the screw member to an upper surface of the second side surface may be longer than a distance from the head of the screw member to a lower surface of the second side surface in a state in which the third casing member is fixed to the first casing member by the screw member fitted into the screw hole.

In this configuration, the head of the screw member is disposed at a position closer to the first casing member than to the second casing member. Accordingly, heat transferred from the first casing member to the screw member is restricted from being transferred from the head of the screw member to the second casing member.

(12) The first casing member may also house a processing unit that performs pass/fail determination of the target object based on the image of the target object acquired by the imaging unit. In this configuration, miniaturization of the image processing sensor while reducing transfer of heat generated by the processing unit to the display unit is enabled.

(13) The image processing sensor further includes an operation unit which is operated by the user, and the processing unit may acquire a reference image that serves as a reference for the pass/fail determination criteria of the target object based on the operation of the operation unit by the user at the time of teaching, set a determination threshold value for the pass/fail determination of the target object based on a matching degree between the reference image and the image acquired by the imaging unit, calculate the matching degree between the image acquired by the imaging unit and the reference image at the time of pass/fail determination of the target object, and perform the pass/fail determination of the target object based on the calculated matching degree and the determination threshold value set at the time of teaching.

In this configuration, the user is capable of acquiring a desired reference image accurately and easily while confirming the image displayed on the display unit at the time of teaching. Therefore, adequate setting of the determination threshold value is achieved. The user is allowed to confirm an image displayed on the display unit also at the time of pass/fail determination of the target object. Accordingly, whether or not the pass/fail determination of the target object is accurately performed may be confirmed easily.

According to the invention, the user is allowed to perform a setting operation accurately and easily while confirming the image of the target object.

DESCRIPTION OF EMBODIMENTS

[1] Basic Configuration and Basic Operation of Image Processing Sensor

Figure 1:
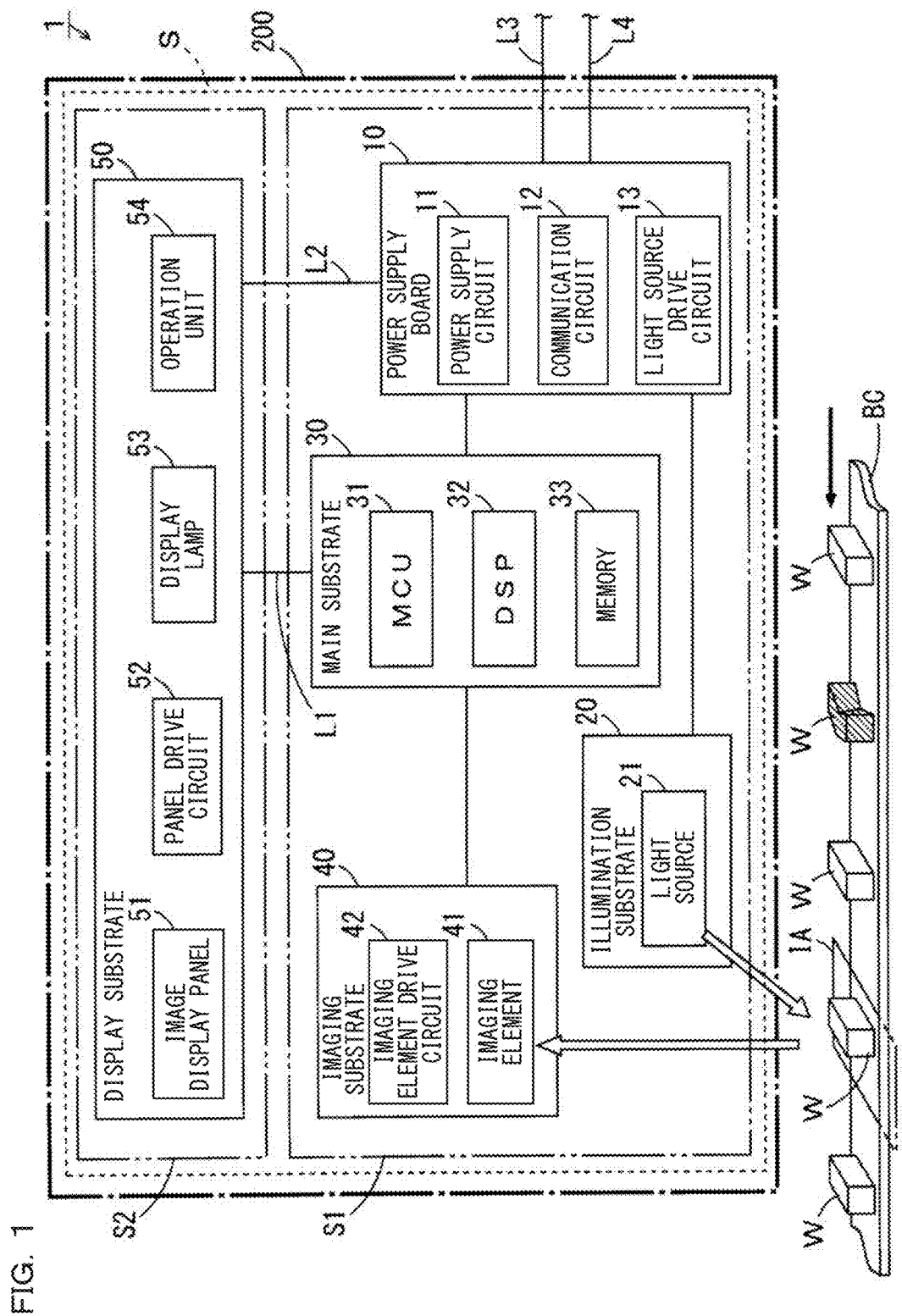
FIG. 1 is a block diagram illustrating a basic configuration of an image processing sensor according to an embodiment of the present invention.

FIG. 1 is a block diagram illustrating a basic configuration of an image processing sensor according to an embodiment of the invention. As illustrated in FIG. 1, an image processing sensor 1 has a configuration in which a power supply board 10, an illumination substrate 20, a main substrate 30, an imaging substrate 40, and a display substrate 50 are housed in an internal space S of a casing 200.

The power supply board 10 is electrically connected to the illumination substrate 20, the main substrate 30, and the display substrate 50 via wiring members. The main substrate 30 is electrically connected to the imaging substrate 40 and the display substrate 50 via the wiring members. In this example, a flexible wiring circuit board is used as a wiring member L1 out of a plurality of the wiring members for coupling the main substrate 30 and the display substrate 50. A harness is used as a wiring member L2 for connecting the power supply board 10 and the display substrate 50. One end of a wiring member L3 for a power supply and one end of a wiring member L4 for communication are connected to the power supply board 10. The other end of the wiring member L3 is connected to a commercial power supply. The other end of the wiring member L4 is connected to an external apparatus of the image processing sensor 1 (for example, a personal computer or a programmable controller).

The power supply board 10 has a configuration including a power supply circuit 11, a communication circuit 12, and a light source drive circuit 13 mounted on a wiring circuit board. The illumination substrate 20 has a configuration including a light source 21 mounted on a wiring circuit board. The main substrate 30 has a configuration including an MCU (microcomputer unit) 31, a DSP (digital signal processor) 32, and a memory 33 mounted on a wiring circuit board. The imaging substrate 40 has a configuration including an imaging element 41 and an imaging element drive circuit 42 mounted on a wiring circuit board. The display substrate 50 has a configuration including an image display panel 51, a panel drive circuit 52, a display lamp 53, and an operation unit 54 mounted on a wiring circuit board.

The image processing sensor 1 is disposed, for example, on a belt conveyor BC on which a plurality of target objects W are conveyed at a constant speed. At a fixed position on the belt conveyor BC, an inspection area IA is set as an imaging region of the imaging element 41.

The light source drive circuit 13 drives the light source 21 based on a drive control signal provided from the DSP 32 described later. Light generated by the light source 21 is emitted toward the inspection area IA. Accordingly, the target object W that is located in the inspection area IA is illuminated. An LED (light-emitting diode) that generates white light is used as the light source 21. Other light-emitting devices such as halogen lamp may be used as the light source 21 instead of the LED.

The imaging element drive circuit 42 drives the imaging element 41 based on the drive control signal provided from the DSP 32 described later. The imaging element 41 images the target object W illuminated in the inspection area IA. A CMOS (Complementary Metal Oxide Semiconductor) is used as the imaging element 41. Other elements such as a CCD (Charge Coupled Device) may be used as the imaging element 41 instead of the CMOS.

In the imaging substrate 40, an A/D converter (analogue-digital converter), which is not illustrated, is mounted on the wiring circuit board in addition to the imaging element 41 and the imaging element drive circuit 42. A light-receiving signal output from the imaging element 41 is sampled by the A/D converter at certain sampling cycles, is converted into a digital signal, and is supplied to the DSP 32 on the main substrate 30.

The DSP 32 generates image data of the target object W based on the supplied digital signal, and memorizes the generated image data in the memory 33. In this manner, an image of the target object W is acquired by the imaging substrate 40. In the memory 33, a teaching program and a determination display program, which will be described later, are memorized in advance in addition to the image data of the target object W.

The DSP 32 executes the teaching program, so that teaching processing is performed on the basis of an operation of the operation unit 54 or the like by the user. In the teaching processing, a reference image and defective product images are acquired. The reference image is an image of a non-defective product (the target object W having no defect), and the defective product images are images of defective products (target objects W having a defect). A threshold value for pass/fail determination of the target object W based on matching degree between the reference image and a newly acquired image of the target object W is set based on the acquired reference image and the defective product images. The threshold value for determination may be set based only on the reference image.

In this embodiment, the matching degree means a degree of approximation of an image of a newly acquired target object W to the reference image. In the following description, the image of the target object W which is newly acquired after teaching processing is referred to as "inspection image". The higher the matching degree is, the more the inspection image is approximate to the reference image, and the lower the matching degree is, the more the inspection image is different from the reference image. Detailed description of the teaching processing will be given later.

The DSP 32 executes the determination display program, so that determination display processing is performed on the basis of an operation of the operation unit 54 or the like by the user. In the determination display processing, a matching degree calculated on a certain inspection image and a threshold value set by the teaching processing are compared. Based on a result of comparison, the pass/fail determination of the target object W corresponding to the inspection image is performed. Detailed description of the determination display processing will be given later.

The DSP 32 provides each of the imaging element drive circuit 42 and the light source drive circuit 13 with a drive control signal as described above. In addition, the DSP 32 provides the MCU 31 with a command instructing the image display panel 51 to display various images.

The MCU 31 provides the panel drive circuit 52 with a display control signal relating to image data to be memorized in the memory 33 in response to the command from the DSP 32. The panel drive circuit 52 drives the image display panel 51 based on the provided display control signal. Accordingly, the image display panel 51 displays at least one of the inspection image, the reference image, the defective product image, the matching degree and the threshold value during the teaching processing and the determination display processing. An organic EL (electroluminescence) panel is used as the image display panel 51. Other display devices such as a liquid crystal display panel may be used as the image display panel 51 instead of the organic EL panel.

The MCU 31 provides the communication circuit 12 and the display lamp 53 with a determination signal that indicates a pass/fail determination result by the determination display processing performed on the target object W. For example, when the matching degree of a certain inspection image is higher than the threshold value in the determination display processing, the DSP 32 determines that the target object W corresponding to the inspection image is a non-defective product. At this time, the MCU 31 provides the communication circuit 12 and the display lamp 53 with a high level (or a low level) determination signal which indicates the non-defective product, for example. In contrast, when the matching degree of a certain inspection image is not higher than the threshold value in the determination display processing, the DSP 32 determines that the target object W corresponding to the inspection image is a defective product. At this time, the MCU 31 provides the communication circuit 12 and the display lamp 53 with a low level (or a high level) determination signal which indicates the defective product, for example.

The communication circuit 12 outputs a determination signal provided by the MCU 31 to an external apparatus of the image processing sensor 1 via the wiring member L4. The display lamp 53 includes a red LED, a green LED, and a drive circuit therefor. In this case, for example, the display lamp 53 emits green light from the green LED upon receipt of a determination signal which indicates a non-defective product, and emits red light from the red LED upon receipt of a determination signal that indicates a defective product.

In an example illustrated in FIG. 1, a second target object W from the right has a shape different from the shape of other target objects W. In addition, the color of the second target object W from the right has a color different from the color of other target objects W. In this case, when the matching degree of the inspection image acquired by imaging the second target object W from the right is smaller than the threshold value set in advance, the target object W is determined to be a defective product. Also, a determination signal that indicates the defective product is output to the external apparatus.

In this embodiment, the internal space S of the casing 200 is divided into a first space portion S1 and a second space portion S2 as indicated by a broken line and a double dashed chain line in FIG. 1. The power supply board 10, the illumination substrate 20, the main substrate 30, and the imaging substrate 40 are housed in the first space portion S1, and at least part of the display substrate 50 is housed in the second space portion S2. Detailed description of the structure of the image processing sensor 1 will be described below.

[2] Detailed Description of Structure of Image Processing Sensor

Figure 2:
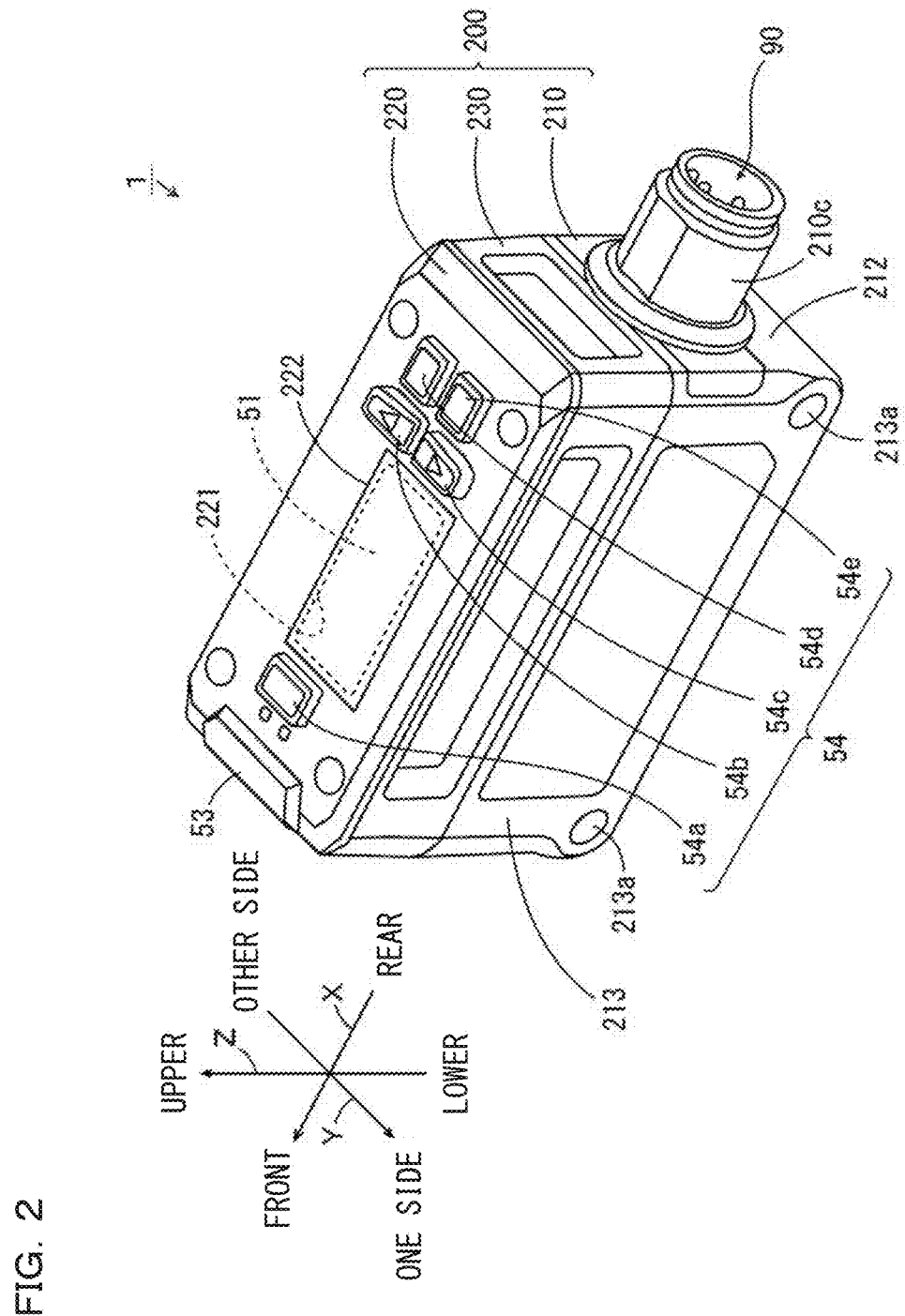
FIG. 2 is a perspective view illustrating an appearance of the image processing sensor.

FIG. 2 is a perspective view illustrating an appearance of the image processing sensor 1. In predetermined drawings from FIG. 2 onward, arrows indicating, respectively, an X-direction, a Y-direction, and a Z-direction orthogonal to each other are shown for clarifying a positional relationship among the components. In the following description, a direction indicated by the arrow in the X-direction is referred to as a front, and a direction opposite thereto is referred to as a rear. A direction indicated by the arrow in the Y-direction is referred to as one side, and a direction opposite thereto is referred to as the other side. In addition, a direction indicated by the arrow in the Z-direction is referred to as upward, and a direction opposite thereto is referred to as downward.

As illustrated in FIG. 2, the casing 200 of the image processing sensor 1 includes a first casing member 210, a second casing member 220, and a coupling casing member 230. The first casing member 210, the second casing member 220, and the coupling casing member 230 are aligned in the Z-direction in such a manner that the coupling casing member 230 is disposed between the first casing member 210 and the second casing member 220. In the embodiment, the coupling casing member 230 is coupled to the first and second casing members 210 and 220, so that the first casing member 210 and the second casing member 220 are coupled.

The first casing member 210, the second casing member 220, and the coupling casing member 230 are formed to surround the internal space S (FIG. 1) of the casing 200.

The first and second casing members 210 and 220 are formed of a metallic material. For example, zinc is used as the metallic material for the first and second casing members 210 and 220. As the metallic material, other metals such as aluminum or magnesium may be used instead of zinc. In contrast, the coupling casing member 230 is formed of a resin material which is lower in heat conductivity than the metallic material of the first and second casing members 210 and 220. As the resin material for the coupling casing member 230, for example, polybutylene terephthalate is used. As the resin material, other resin materials such as polycarbonate may be used instead of the polybutylene terephthalate.

Figure 3:
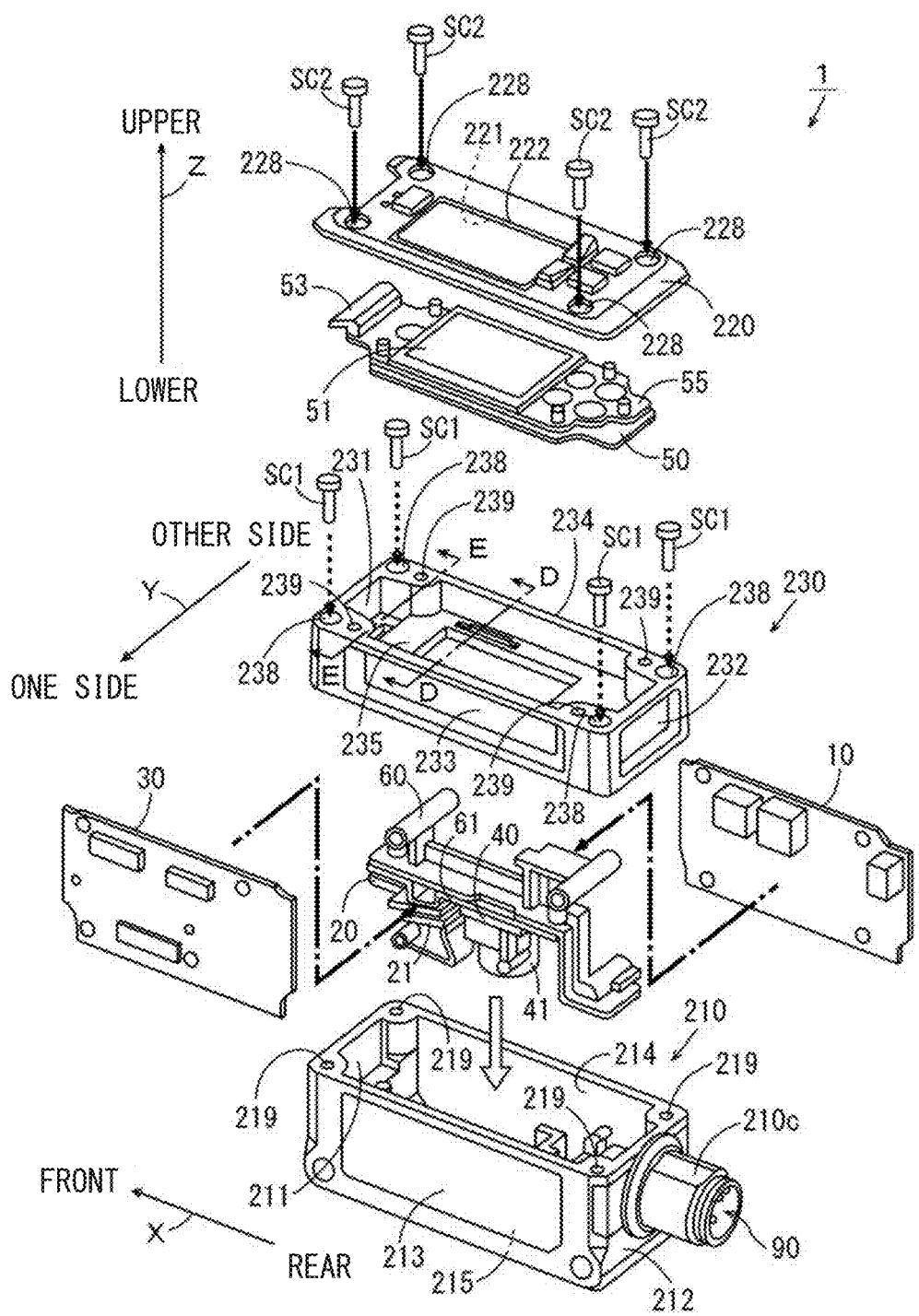
FIG. 3 is an exploded perspective view of the image processing sensor.

FIG. 3 is an exploded perspective view of the image processing sensor 1 in FIG. 2. As illustrated in a lower part of FIG. 3, the first casing member 210 includes a front wall 211, a rear wall 212, a one side wall 213, an other side wall 214, a bottom wall 215, and a connector cover 210c.

The connector cover 210c has a cylindrical shape, and is provided so as to extend rearward from the rear wall 212. The rear wall 212 is formed with a through hole, which is not illustrated, for communicating the internal space of the connector cover 210c with a space in front of the rear wall 212. A connector 90 is provided in the interior of the connector cover 210c. The connector 90 includes a plurality of terminals for connecting the wiring members L3 and L4 in FIG. 1. The first casing member 210 is provided with screw holes 219 at four corners in an upper end portion thereof.

As illustrated in an upper part of FIG. 3, the second casing member 220 is a substantially rectangular plate member. A thickness of the second casing member 220 in a vertical direction is not limited. As illustrated in FIG. 3, the second casing member 220 may be a cover-type member which is thin in the vertical direction, or may be a member having a thickness larger than that of the second casing member 220 in FIG. 3. Furthermore, the thickness of the second casing member 220 in the vertical direction may be different from each other in a plurality of portions of the second casing member 220. For example, the second casing member 220 may be formed to have a larger thickness in an area from an outer peripheral edge portion by a certain width than an area inside thereof. In such a case, the second casing member 220 is provided with a depressed portion that faces downward.

The second casing member 220 is provided at a substantially center portion thereof with a rectangular opening 221. A transparent cover member 222 is provided on the second casing member 220 so as to close the opening 221 from above. In addition to the cover member 222, a plurality of members that constitute parts of the operation unit 54 in FIG. 1 are provided on the second casing member 220. The second casing member 220 is provided with screw insertion holes 228 at four corners thereof. The cover member 222 is formed of, for example, a transparent glass or a transparent resin material.

As illustrated in a middle part of FIG. 3, the coupling casing member 230 includes a front wall 231, a rear wall 232, a one side wall 233, another side wall 234, and a heat-insulating wall 235. The heat-insulating wall 235 is formed at a substantially center portion of the coupling casing member 230 in the Z-direction so as to connect inner surfaces of the front wall 231, the rear wall 232, the one side wall 233, and the other side wall 234, and so as to extend orthogonally thereto in the Z-direction. The coupling casing member 230 is provided with a screw insertion hole 238 and a screw hole 219 at each of the four corners of an upper end portion thereof. The screw insertion hole 238 and the screw hole 219 at each corner are disposed at positions separate from each other.

A resin-made substrate holder 60 is used for assembling the image processing sensor 1. The illumination substrate 20 and the imaging substrate 40 are mounted on a lower portion of the substrate holder 60 via a heat dissipation member 61. The heat dissipation member 61 is formed, for example, of a metallic material such as copper. As illustrated by an arrow of a thick long-and-short dash line in FIG. 3, the main substrate 30 and the power supply board 10 are mounted on one side portion and the other side portion, respectively, of the substrate holder 60. Subsequently, as illustrated by a hollow arrow in FIG. 3, the substrate holder 60 is mounted in an interior of the first casing member 210, and the power supply board 10 and the connector 90 are electrically connected. At this time, the heat dissipation member 61 comes into contact with part of the first casing member 210.

Subsequently, a lower end portion (lower surfaces of the front wall 231, the rear wall 232, the one side wall 233, and the other side wall 234) of the coupling casing member 230 is coupled to an upper end portion (upper surfaces of the front wall 211, the rear wall 212, the one side wall 213, and the other side wall 214) of the first casing member 210 by using a plurality of (four in this example) screws SC1 formed of a metal. Specifically, as illustrated by arrows of thick broken lines in FIG. 3, the respective screws SC1 are screwed into the screw holes 219 of the first casing member 210 through the screw insertion holes 238 of the coupling casing member 230. In this state, the first space portion S1 illustrated in FIG. 1 is formed below the heat-insulating wall 235 of the coupling casing member 230.

In this embodiment, the first space portion S1 is a space surrounded by the front walls 211 and 231, the rear walls 212 and 232, the one side walls 213 and 233, the other side walls 214 and 234, the bottom wall 215 and the heat-insulating wall 235.

Subsequently, the display substrate 50 is mounted on the lower surface of the second casing member 220 from below. In an example illustrated in FIG. 3, the image display panel 51 and the display lamp 53 are mounted on the wiring circuit board via a panel holder 55. The image display panel 51 is positioned so as to overlap with the opening 221 of the second casing member 220.

Subsequently, the second casing member 220 is coupled to an upper end portion (upper surfaces of the front wall 231, the rear wall 232, the one side wall 233, and the other side wall 234) of the coupling casing member 230 by using a plurality (four in this example) of screws SC2 formed of a metal. Specifically, as illustrated by arrows of thick solid lines in FIG. 3, the respective screws SC2 are screwed into screw holes 239 of the coupling casing member 230 through the screw insertion holes 228 of the second casing member 220. In this state, the second space portion S2 illustrated in FIG. 1 is formed above the heat-insulating wall 235 of the coupling casing member 230.

In this embodiment, the second space portion S2 is a space surrounded by the second casing member 220, the front wall 231, the rear wall 232, the one side wall 233, the other side wall 234, and the heat-insulating wall 235.

The configuration of the coupling casing member 230 will be described further with reference to FIG. 3. As described above, the first casing member 210 is mounted on the lower surface of the coupling casing member 230 with the screws SC1, and thus a first abutment surface that comes into abutment with the first casing member 210 is formed. The second casing member 220 is mounted on the upper surface of the coupling casing member 230 with the screws SC2, and thus a second abutment surface that comes into abutment with the second casing member 220 is formed. The coupling casing member 230 includes an outer wall that extends in the vertical direction (the front wall 231, the rear wall 232, the one side wall 233, and the other side wall 234) so that the first abutment surface and the second abutment surface are separated from each other. In other words, the coupling casing member 230 includes an outer wall having a predetermined thickness in a direction of attachment of the first casing member 210 (or a direction of attachment of the second casing member 220) so that the upper surface of the first casing member 210 that comes into abutment with the first abutment surface does not come into contact with the lower surface of the second casing member 220 that comes into abutment with the second abutment surface.

Although the configuration in which the front wall 231, the rear wall 232, the one side wall 233, and the other side wall 234 are formed integrally with each other with the same member as the outer wall as described above is employed in this embodiment, for example, a plurality of the walls may be formed of different members entirely or partly.

Figure 4:
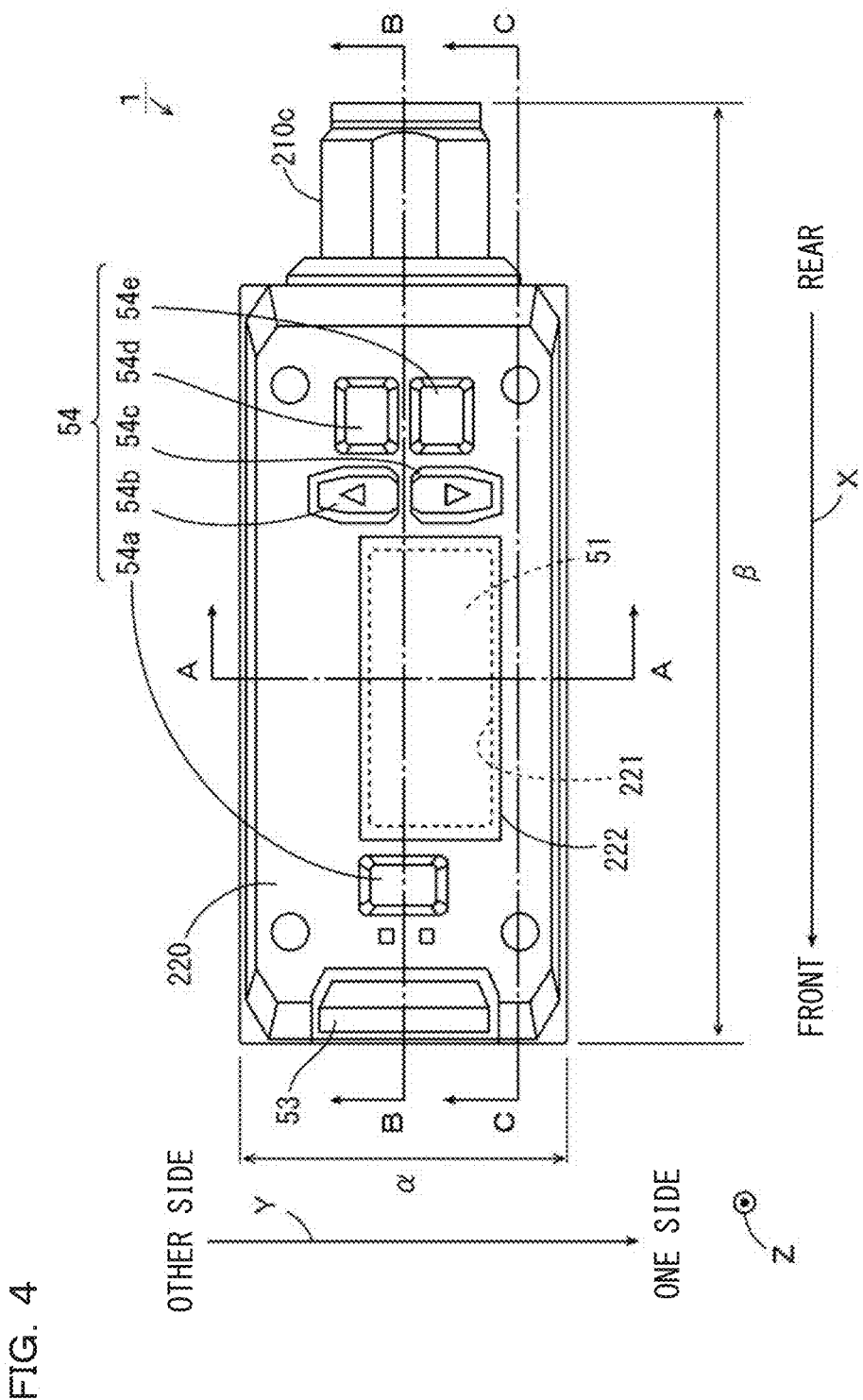
FIG. 4 is a drawing of the image processing sensor when viewed from above.
Figure 5:
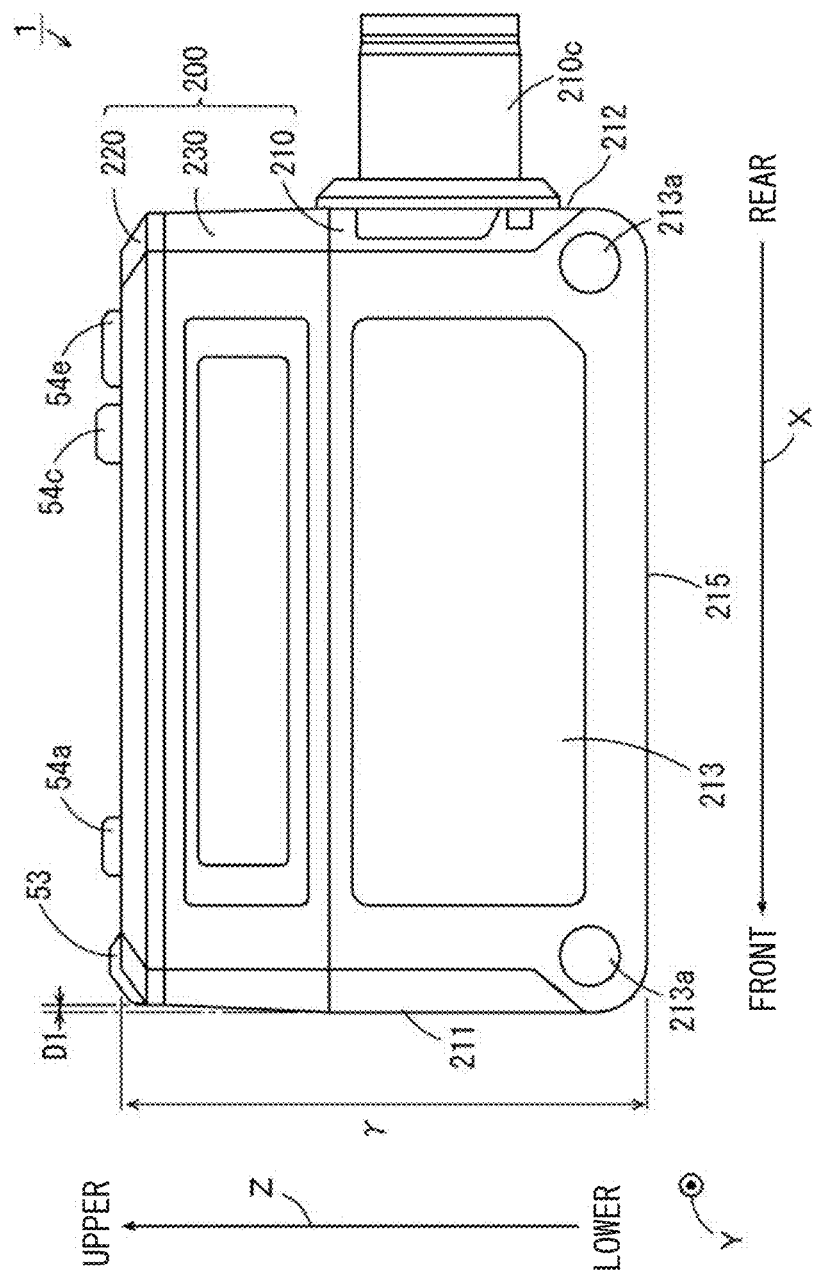
FIG. 5 is a drawing of the image processing sensor when viewed from one lateral side.
Figure 6:
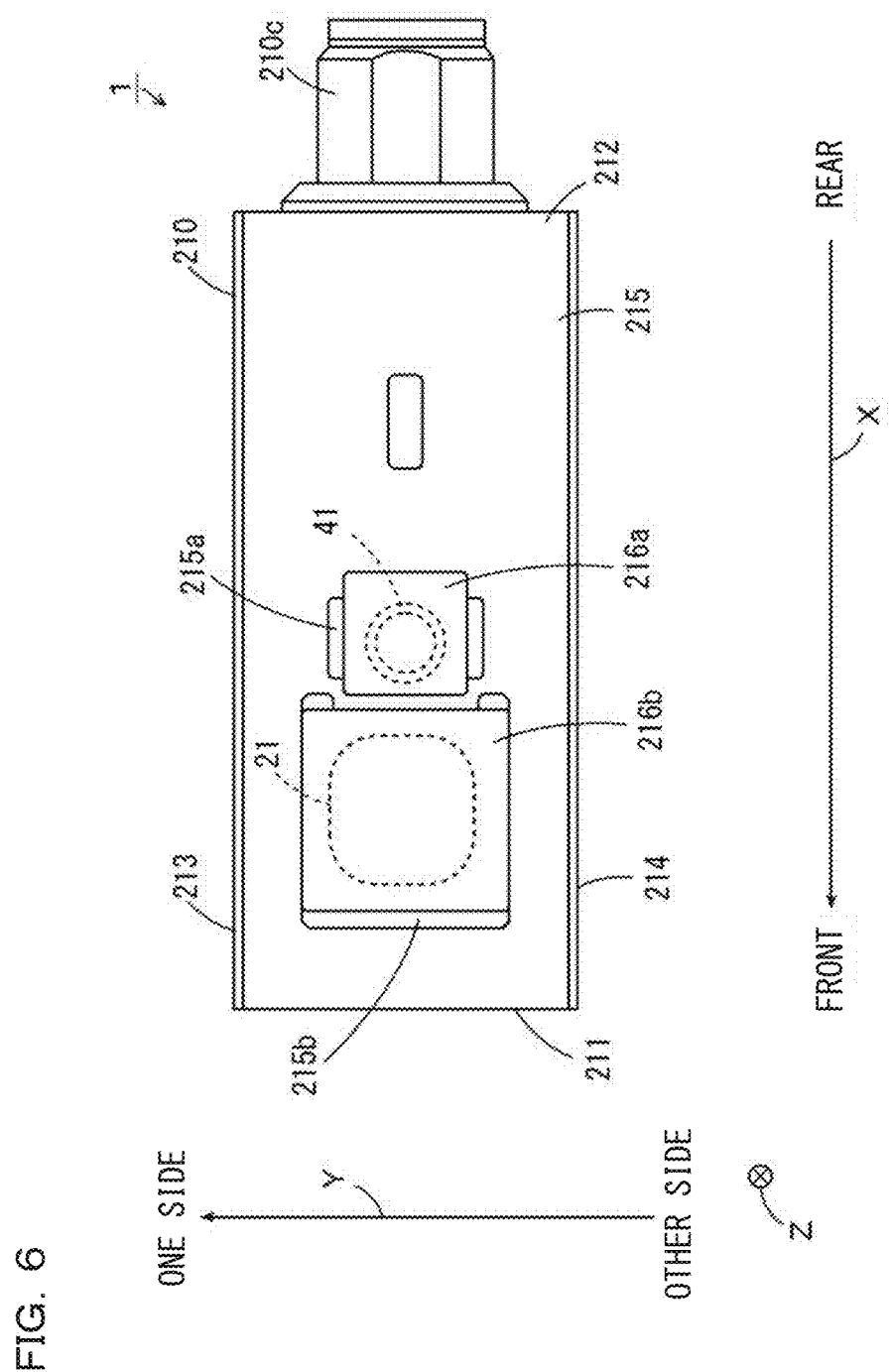
FIG. 6 is a drawing of the image processing sensor when viewed from below.

FIG. 4 is a drawing of the image processing sensor 1 viewed from above, FIG. 5 is a drawing of the image processing sensor 1 viewed from a side, and FIG. 6 is a drawing of the image processing sensor 1 viewed from below.

As illustrated in FIG. 4, the display lamp 53 is provided at a front end portion of the second casing member 220 so as to be exposed to outside of the image processing sensor 1. At a center portion of the second casing member 220, the user is allowed to visually check the image display panel 51 in the casing 200 through the cover member 222 and the opening 221. The second casing member 220 is provided with a set button 54a at a position forward of the image display panel 51 so as to protrude upward. In addition, the second casing member 220 is provided with an up button 54b, a down button 54c, a return button 54d, and a switch button 54e at positions rearward of the image display panel 51 so as to protrude upward. The set button 54a, the up button 54b, the down button 54c, the return button 54d, and the switch button 54e constitute part of the operation unit 54 in FIG. 1.

As illustrated in FIG. 5, the first casing member 210 is provided with mounting portions 213a on the one side wall 213 at the lower front and rear portions thereof for fixing the image processing sensor 1 to predetermined supporting members or the like. The respective mounting portions 213a are, for example, screw holes or through holes. The mounting portions are also provided on the other side wall 214 at lower front and rear portions, respectively.

As illustrated in FIG. 6, the first casing member 210 is provided with an opening 215a at a substantially center portion of the bottom wall 215. A transparent cover member 216a is provided on the bottom wall 215 and covers the opening 215a from below. In the interior of the first casing member 210, the imaging element 41 is positioned so as to face downward through the opening 215a.

The bottom wall 215 is provided with an opening 215b at a position forward of the opening 215a. The bottom wall 215 is provided with a transparent cover member 216b and covers the opening 215b from below. In the interior of the first casing member 210, the light source 21 is positioned so as to face downward via the opening 215b. The cover members 216a and 216b are formed, for example, of a transparent glass or a transparent resin material.

A dimension α (see FIG. 4) of the casing 200 of this embodiment in the Y-direction (width direction) is approximately 20 mm, and a dimension β (see FIG. 4) of the casing 200 including the connector cover 210c in the X-direction (length direction) is approximately 75 mm. A dimension γ (see FIG. 5) of the casing 200 in the Z-direction (height direction) is approximately 30 mm.

[3] Effects Relating to Structure

Figure 7:
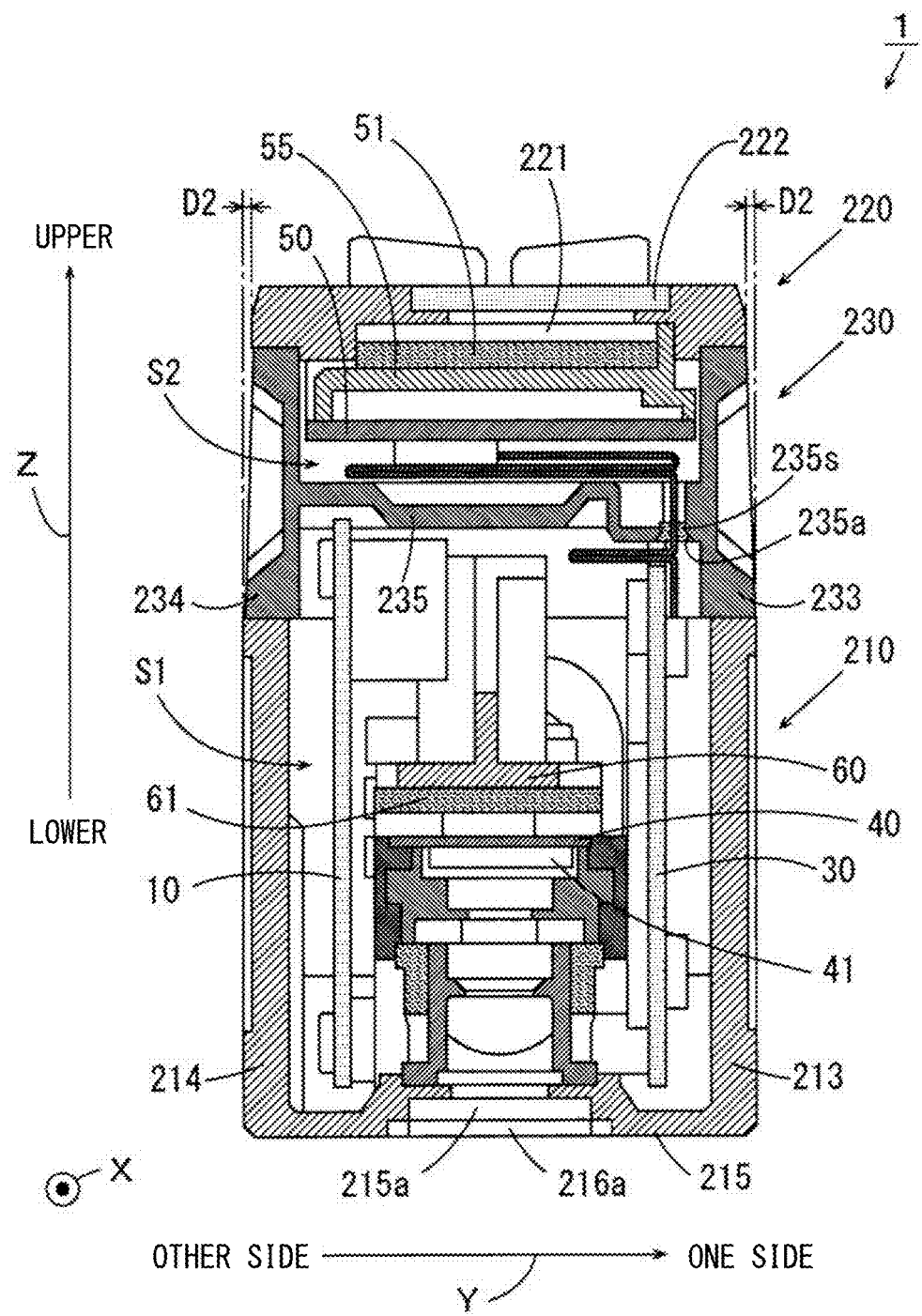
FIG. 7 is a vertical cross-sectional view taken along a line A-A in FIG. 4.
Figure 8:
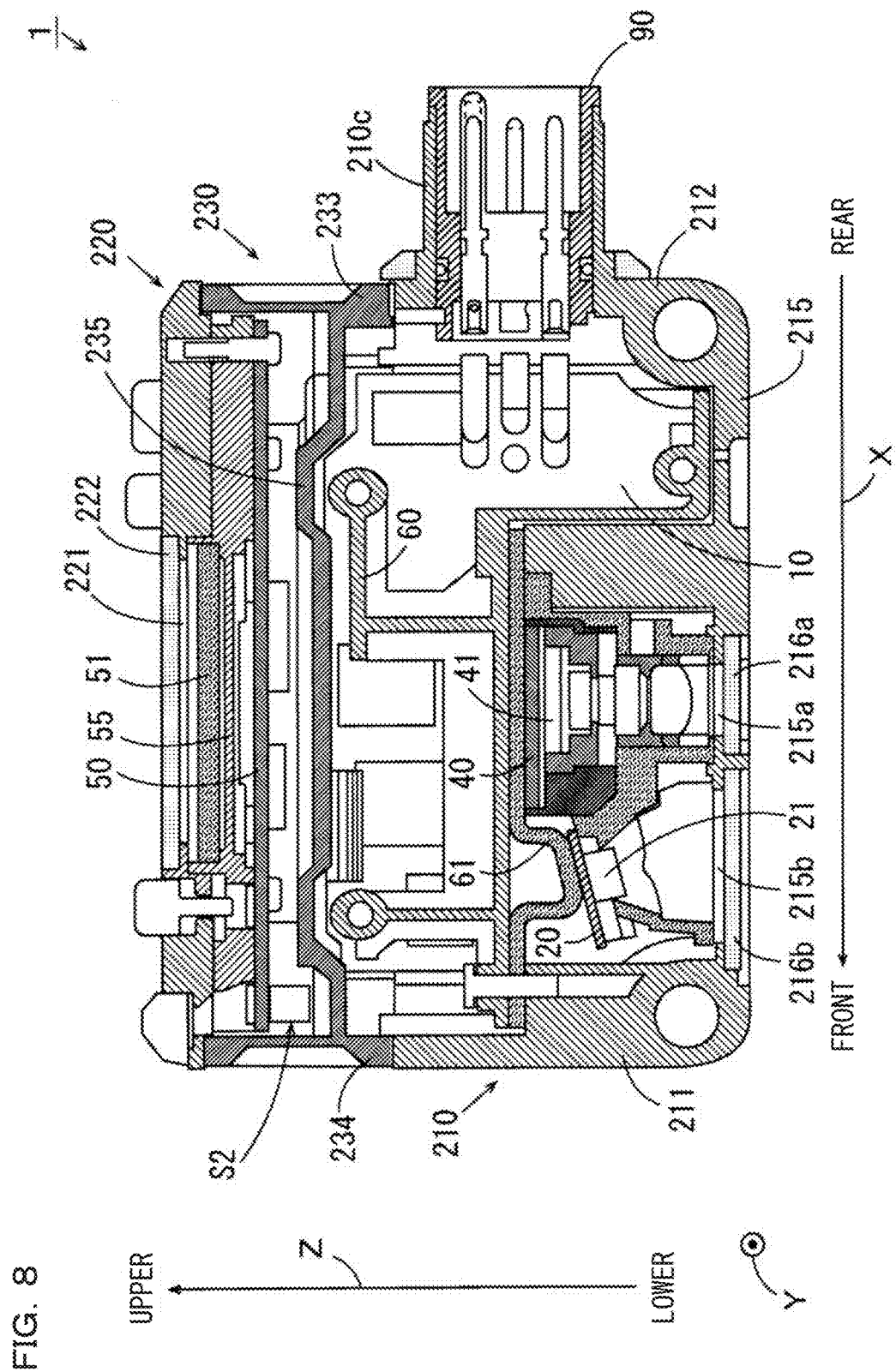
FIG. 8 is a vertical cross-sectional view taken along a line B-B in FIG. 4.
Figure 9:
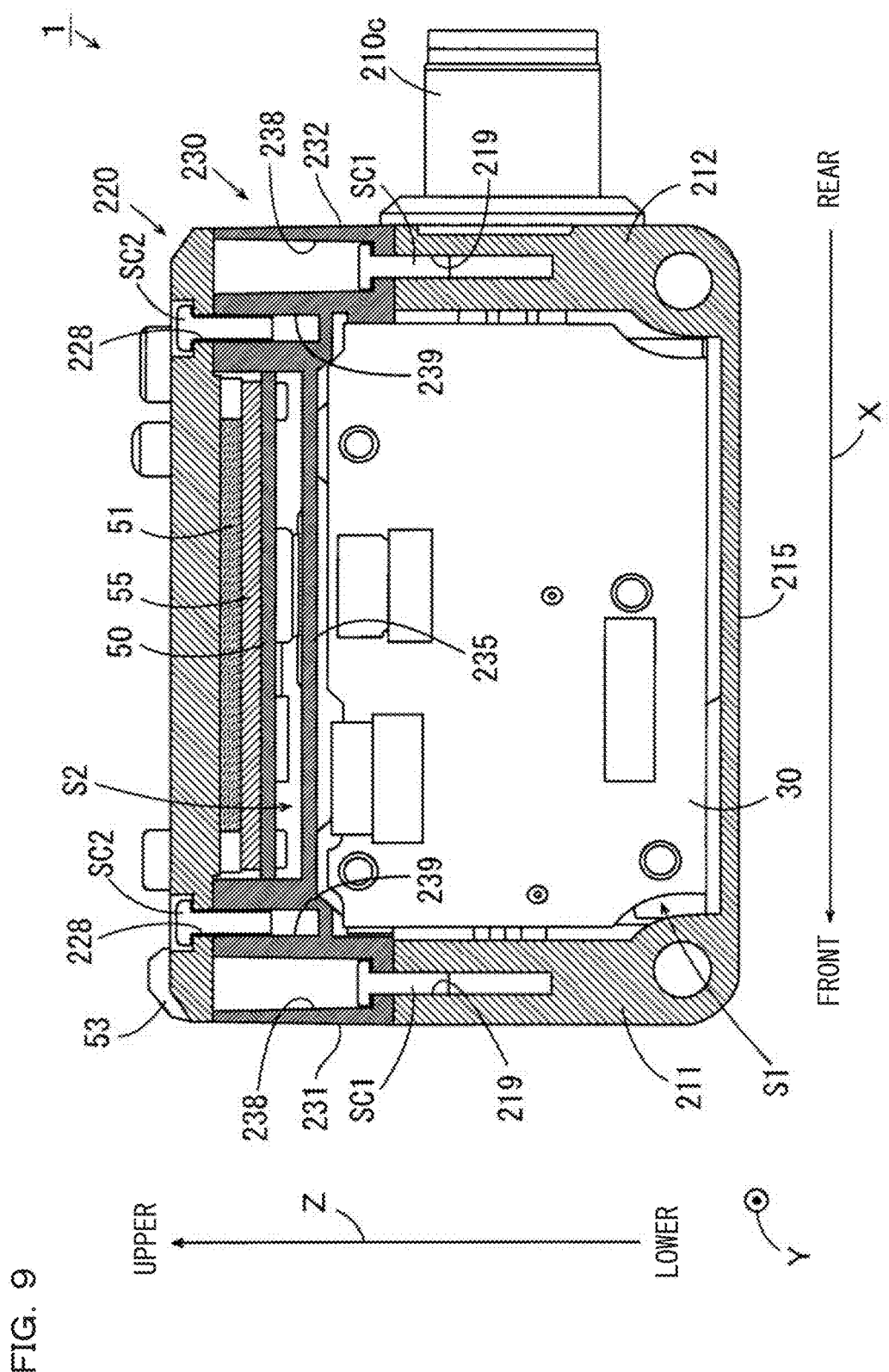
FIG. 9 is a vertical cross-sectional view taken along a line C-C in FIG. 4.

FIG. 7 is a vertical cross-sectional view taken along a line A-A in FIG. 4. FIG. 8 is a vertical cross-sectional view taken along a line B-B in FIG. 4, and FIG. 9 is a vertical cross-sectional view taken along a line C-C in FIG. 4. As illustrated in FIG. 7 to FIG. 9, the power supply board 10, the illumination substrate 20, the main substrate 30, and the imaging substrate 40 are housed in the first space portion S1. In contrast, a portion of the display substrate 50 other than the display lamp 53 and the operation unit 54 is housed in the second space portion S2.

When the image processing sensor 1 is in operation, heat is generated mainly from the light source 21 (FIG. 8) of the illumination substrate 20 and the imaging element 41 (FIG. 7 and FIG. 8) of the imaging substrate 40. The light source 21 and the imaging element 41 are housed in the first space portion S1 surrounded by the first casing member 210 and are coupled to the first casing member 210 via the heat dissipation member 61. Accordingly, part of the heat generated by the light source 21 and the imaging element 41 is transferred to the first casing member 210 through the heat dissipation member 61.

In the manner as described above, the first casing member 210 and the second casing member 220 are coupled to each other via the coupling casing member 230 having a low heat conductivity. Therefore, major part of the heat transferred from the light source 21 and the imaging element 41 to the first casing member 210 is not transferred to the coupling casing member 230, and is dissipated from respective portions (for example, the connector 90, the connector cover 210c, the one side wall 213, and the other side wall 214) of the first casing member 210 to the external space of the casing 200.

When the image processing sensor 1 is in operation, reminder of the heat generated by the light source 21 and the imaging element 41 is dissipated to the first space portion S1. The internal space S in the casing 200 (FIG. 1) is divided into the first space portion S1 and the second space portion S2 by the heat-insulating wall 235 of the coupling casing member 230. The heat-insulating wall 235 is formed of a resin material having a low heat conductivity as part of the coupling casing member 230.

In this case, heat of an atmosphere in the first space portion S1 is less likely to be transferred to an atmosphere in the second space portion S2 owing to the heat-insulating wall 235. Therefore, even when the temperature of atmosphere in the first space portion S1 rises due to the heat dissipated from the light source 21 and the imaging element 41 into the first space portion S1, an amount of heat transferred from the atmosphere in the first space portion S1 to the atmosphere in the second space portion S2 is reduced. Accordingly, the temperature rise of the atmosphere in the second space portion S2 is restricted. Therefore, the amount of heat transferred from the light source 21 and the imaging element 41 to the display substrate 50 via the atmosphere in the internal space S of the casing 200 (FIG. 1) is reduced.

Accordingly, the amount of heat transferred from the light source 21 and the imaging element 41 to the display substrate 50 through the first casing member 210, the coupling casing member 230, and the second casing member 220 is also reduced. Therefore, even when the image display panel 51 of the display substrate 50 does not have high heat resistance, the image display panel 51 is prevented from malfunctioning due to the influence of heat generated by the light source 21 and the imaging element 41. Consequently, the user is allowed to perform the setting operation of the image processing sensor 1 accurately and easily while confirming an image displayed on the image display panel 51.

As described in FIG. 7, the heat-insulating wall 235 partitions the internal space of the coupling casing member 230 by dividing into two parts in the vertical direction. In this case, the internal space of the coupling casing member 230 may be used as a space for housing one or more components. Therefore, flexibility in design of the image processing sensor 1 is improved.

In this embodiment, a cross section of the first casing member 210 taken along a direction parallel to an XY-direction has substantially the same shape (rectangular shape) as a cross section of the coupling casing member 230 taken along a direction parallel to the XY-direction. Accordingly, the coupling casing member 230 may be coupled to the upper end portion of the first casing member 210 easily.

As described above, when the heat-insulating wall 235 is formed as part of the coupling casing member 230, reduction of the number of components of the image processing sensor 1 is achieved. In addition, assembly of the image processing sensor 1 is facilitated.

When the image processing sensor 1 is in operation, the image display panel 51 also generates heat at a temperature lower than the temperature of the light source 21 and the imaging element 41. The heat generated by the image display panel 51 is transferred to the second casing member 220 and is dissipated. Therefore, the image display panel 51 is prevented from malfunctioning due to the influence of the heat generated by the image display panel 51.

As illustrated in FIG. 3 and FIG. 9, the plurality of screws SC1 formed of a metal are used for fixing the first casing member 210 and the coupling casing member 230 to each other, and a plurality of the screws SC2 formed of a metal are used for fixing the second casing member 220 and the coupling casing member 230 to each other.

In the coupling casing member 230, screw heads of the respective screws SC1 are positioned within the screw insertion holes 238 in a state in which the first casing member 210 and the coupling casing member 230 are fixed to each other. Distal end portions of the respective screws SC2 are positioned in the screw holes 239 in a state in which the second casing member 220 and the coupling casing member 230 are fixed to each other. In the manner described above, the screw insertion hole 238 and the screw hole 239 formed at each of the four corners of the coupling casing member 230 are disposed separately from each other. Therefore, the screws SC1 and the screws SC2 do not come into contact with each other.

Therefore, when the image processing sensor 1 is in operation, the heat transferred from the light source 21 and the imaging element 41 to the screws SC1 through the first casing member 210 is restricted from being transferred to the screws SC2. As a result, the heat is prevented from being transferred from the first casing member 210 to the second casing member 220 via the screws SC1 and the screws SC2.

As illustrated in FIG. 9, the screw heads of the respective screws SC1 are positioned closer to the lower end of the coupling casing member 230 than to the upper end of the coupling casing member 230 in a state in which the first casing member 210 and the coupling casing member 230 are coupled to each other. In this case, heat transferred from the first casing member 210 to the respective screws SC1 is less likely to be transferred from the screw heads thereof to the second casing member 220.

Part of heat transferred from the light source 21 and the imaging element 41 to the first casing member 210 is also transferred to the coupling casing member 230. Part of the heat transferred to the coupling casing member 230 is dissipated from respective parts of the coupling casing member 230 to an external space of the casing 200.

In the coupling casing member 230 of this example, as illustrated in FIG. 7 and FIG. 8, center portions of the front wall 231, the rear wall 232, the one side wall 233, and the other side wall 234 are formed to be thinner than other portions thereof.

In this case, heat is less likely to be transferred in the thinner portions of the coupling casing member 230 compared with other portions. Therefore, the amount of heat to be transferred from the first casing member 210 to the second casing member 220 through the coupling casing member 230 is reduced. Accordingly, the temperature rise of the display substrate 50 caused by the heat generating from the light source 21 and the imaging element 41 is further prevented.

Figure 10:
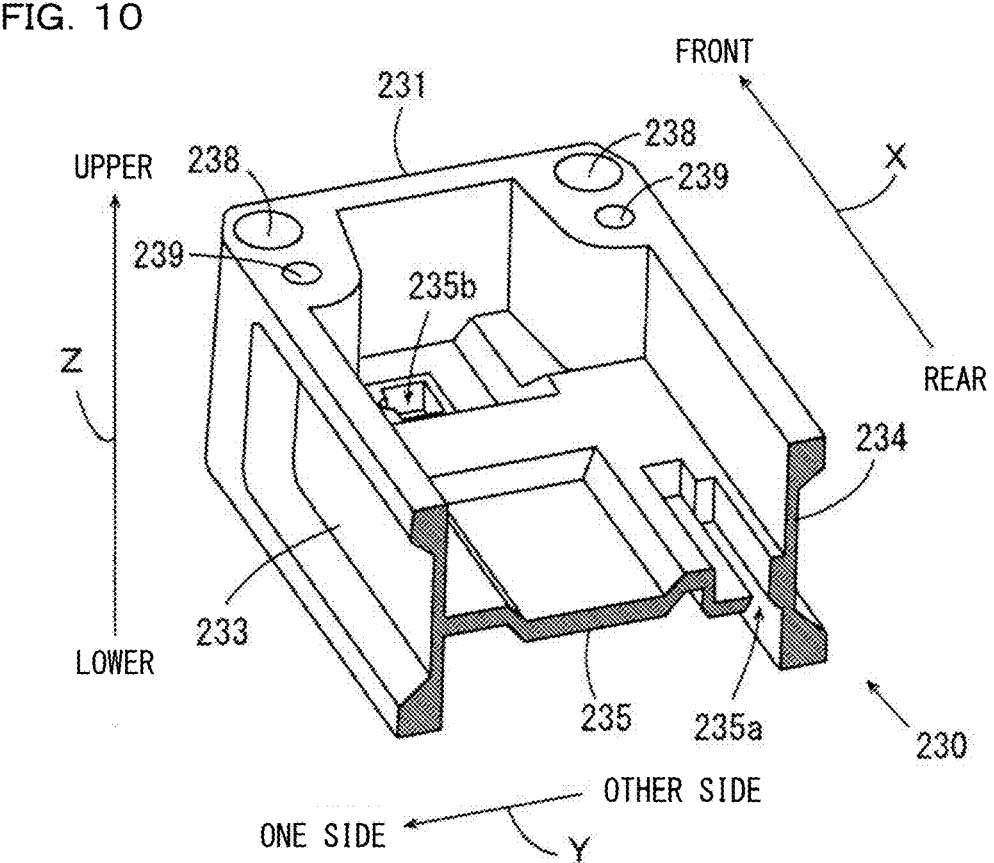
FIG. 10 is a perspective view illustrating a state in which part of a coupling casing member in FIG. 3 is cut away.
Figure 11:
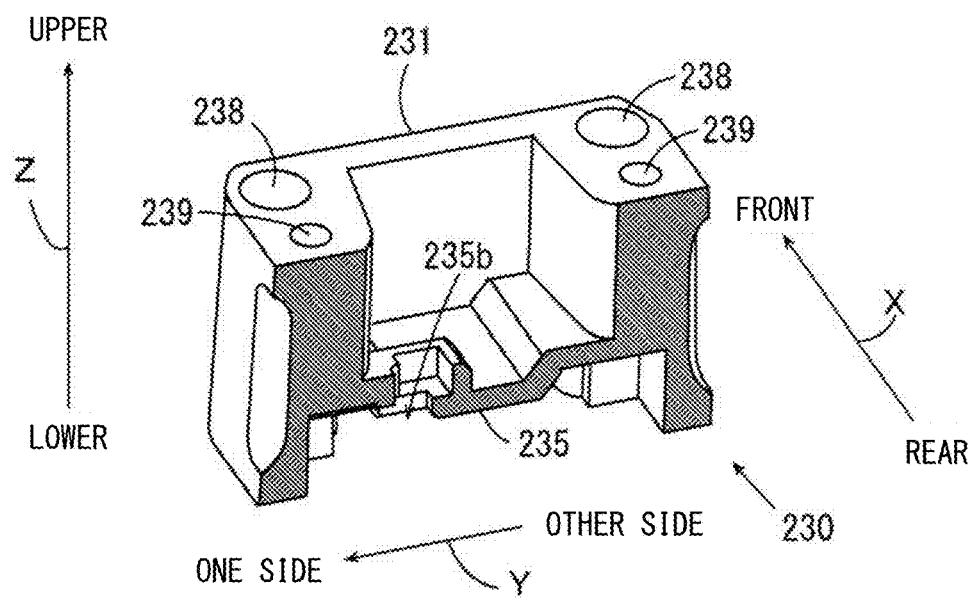
FIG. 11 is a perspective view illustrating a state in which part of the coupling casing member in FIG. 3 is cut away.

FIG. 10 and FIG. 11 are perspective views illustrating a state in which part of the coupling casing member 230 in FIG. 3 is cut away. In FIG. 10, a vertical cross-section taken along a line D-D in FIG. 3 is illustrated by hatching. In FIG. 11, a vertical cross-section taken along a line E-E in FIG. 3 is illustrated by hatching. As illustrated in FIG. 10 and FIG. 11, the heat-insulating wall 235 is provided with openings 235a, 235b for allowing insertion of the wiring members L1 and L2 between the first space portion S1 and the second space portion S2.

When assembling the image processing sensor 1, the wiring member L1 extending from the main substrate 30 is inserted into the opening 235a when the coupling casing member 230 is coupled to the first casing member 210. The wiring member L2 extending from the power supply board 10 is inserted into the opening 235b.

As illustrated in FIG. 7, the opening 235a is provided with an infilling member 235s that infills a gap between an inner edge of the opening 235a and the wiring member L1 in a state in which the wiring member L1 is inserted therein. A sponge, for example, may be used as the infilling member 235s. The opening 235b is also provided with the infilling member 235s that infills a gap between an inner edge of the opening 235b and the wiring member L2 in a state in which the wiring member L2 is inserted therein.

With the configuration described above, the amount of heat transferred between the first space portion S1 and the second space portion S2 adjacent to each other is reduced, and the power supply board 10, the main substrate 30, and the display substrate 50 are electrically connected. Therefore, miniaturization of the image processing sensor 1 is enabled.

When the gap between the inner edge of the opening 235a and the wiring member L1 and the gap between the inner edge of the opening 235b and the wiring member L2 are sufficiently small, the infilling member 235s do not necessarily have to be provided. Accordingly, the number of components of the image processing sensor 1 is reduced. In addition, assembly of the image processing sensor 1 is facilitated.

In this embodiment, a sum of an opening surface area of the opening 235a and an opening surface area of the opening 235b is preferably not larger than 10% of the surface area of the heat-insulating wall 235 that is projected on a surface parallel to the XY-direction, and more preferably not larger than 5%. The term the "opening surface area of the opening 235a" refers to a surface area of an area surrounded by the inner edge of the opening 235a. The term the "opening surface area of the opening 235b" refers to a surface area of an area surrounded by the inner edge of the opening 235b.

As illustrated in FIG. 5 and FIG. 6, the front wall 211 of the first casing member 210 has a flat outer surface parallel to the Y-direction and the Z-direction. As illustrated in FIG. 6 and FIG. 7, each of the one side wall 213 and the other side wall 214 of the first casing member 210 has a flat outer surface parallel to the X-direction and the Z-direction. These outer surfaces function as mounting surfaces for mounting the image processing sensor 1 to, for example, a flat installation surface in the factory.

As illustrated in FIG. 5, an outer surface of the front end portion of the second casing member 220 is positioned rearward of the outer surface of the front wall 211 by a distance corresponding to a distance D1. In other words, an outer surface of the front end of the second casing member 220 is offset rearward from the outer surface of the front wall 211. Therefore, when the outer surface of the front wall 211 is mounted on a flat installation surface, the second casing member 220 does not come into contact with the installation surface.

As illustrated in FIG. 7, an outer surface of one side end portion of the second casing member 220 is positioned on the other side of the outer surface of the one side wall 213 by a distance corresponding to a distance D2. In other words, the outer surface of the second casing member 220 at an end on one side is offset to the other side from an outer surface of the one side wall 213. Therefore, when the outer surface of the one side wall 213 is mounted on a flat installation surface, the second casing member 220 does not come into contact with the installation surface.

As illustrated in FIG. 7, an outer surface of the second casing member 220 at the other end is positioned on the one side of the outer surface of the other side wall 214 by a distance corresponding to the distance D2. In other words, the outer surface of the second casing member 220 at an end on the other side is offset to the one side from the outer surface of the other side wall 214. Therefore, when the outer surface of the other side wall 214 is mounted on a flat installation surface, the second casing member 220 does not come into contact with the installation surface.

In this manner, when the image processing sensor 1 of this example is mounted on a flat installation surface, the second casing member 220 does not come into contact with the installation surface. Accordingly, the heat transferred from the light source 21 and the imaging element 41 to the first casing member 210 is prevented from being transferred to the second casing member 220 through the installation surface.

In the image processing sensor 1, the display substrate 50 is mounted on a lower surface of the second casing member 220, so that the image display panel 51 is housed in the interior of the second space portion S2. In this state, the user is allowed to visually check the image display panel 51 through the transparent cover member 222. Accordingly, the image display panel 51 is protected by the second casing member 220 and the cover member 222. The second space portion S2 is effectively utilized by the image display panel 51 housed in the interior of the second space portion S2. Therefore, miniaturization of the image processing sensor 1 is enabled.

The mounting position of the display substrate 50 is not limited to the example described above. For example, the display substrate 50 may be mounted on an upper surface of the heat-insulating wall 235 of the coupling casing member 230 instead of the lower surface of the second casing member 220.

The bottom wall 215 of the first casing member 210 covers the internal space S (FIG. 1) of the casing 200 in the Z-direction from below. As illustrated in FIG. 8, the bottom wall 215 is provided with the opening 215b that guides light generated by the light source 21 to the inspection area IA (FIG. 1), and the cover member 216b that covers the opening 215b is provided. The bottom wall 215 is provided with the opening 215a that guides light from the inspection area IA (FIG. 1) to the imaging element 41, and the cover member 216a for covering the opening 215a is provided.

In contrast, the second casing member 220 covers the internal space S (FIG. 1) of the casing 200 in the Z-direction from above. As described above, the second casing member 220 is provided with the opening 221 that allows for a visual check of the image display panel 51 from outside the casing 200 and is provided with the cover member 222 for covering the opening 221.

In this case, the image processing sensor 1 is arranged so that the bottom wall 215 faces the target object W, whereby the target object W is illuminated by light coming out from the opening 215b of the bottom wall 215 through the cover member 216b. The illuminated target object W is imaged by the imaging element 41 through the cover member 216a and the opening 215a of the bottom wall 215. In this state, the user is allowed to visually check the image display panel 51 through the cover member 222 and the opening 221 of the second casing member 220 from above the image processing sensor 1. Therefore, convenience of the image processing sensor 1 is improved.

[4] Simulation

Figure 12:
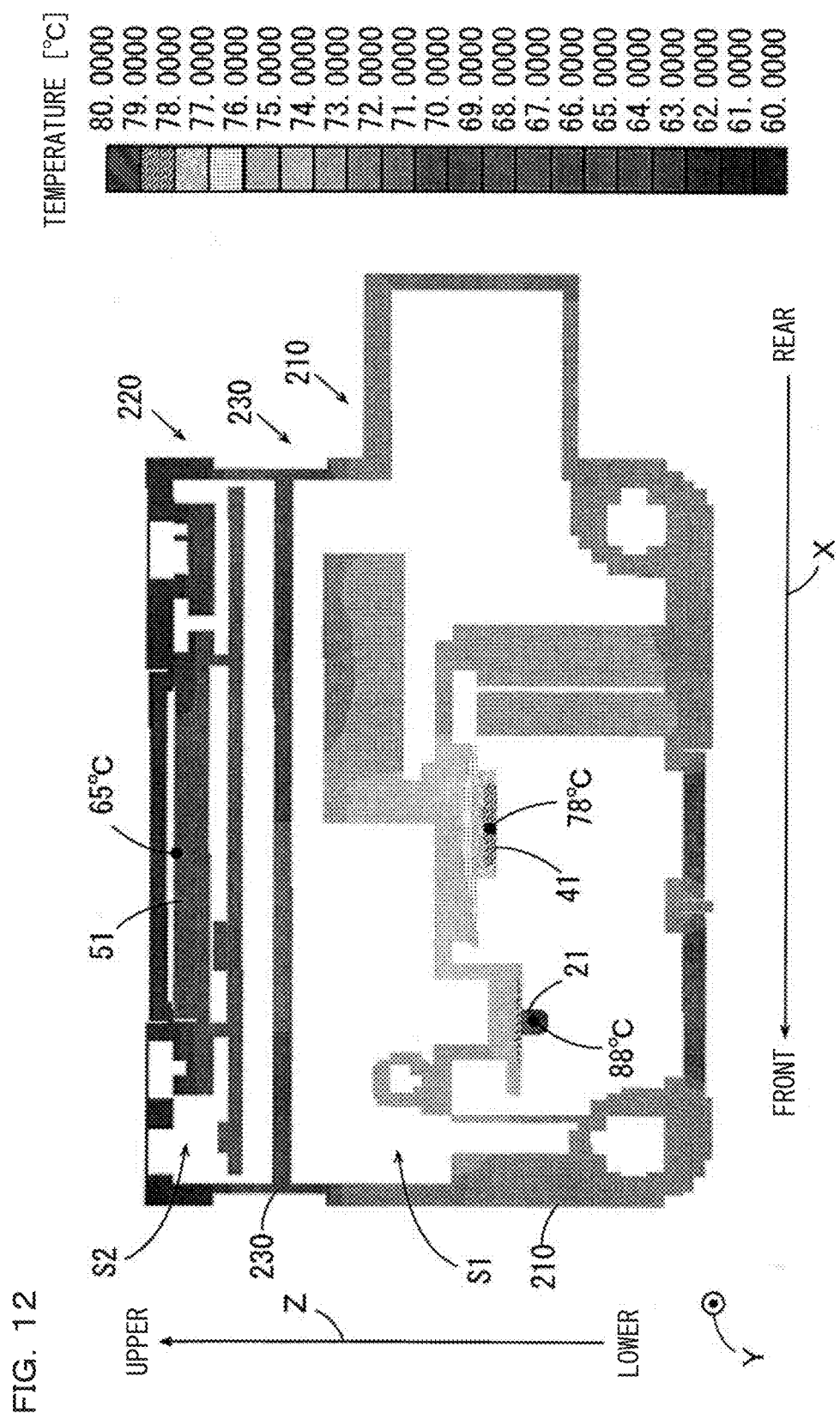
FIG. 12 is a drawing illustrating a result of simulation of temperature distribution of the image processing sensor.

The inventor obtained a temperature distribution in the image processing sensor 1 when the image processing sensor 1 was in operation by simulation. FIG. 12 is a drawing illustrating a result of simulation of the temperature distribution of the image processing sensor 1.

As illustrated in FIG. 12, the light source 21 had a temperature of approximately 88° C., the imaging element 41 had a temperature of approximately 78° C., and the first casing member 210 had a temperature ranging from approximately 70° C. to approximately 75° C. The coupling casing member 230 had a temperature ranging from approximately 65° C. to approximately 70° C. Furthermore, the image display panel 51 had a temperature of approximately 65° C. and the second casing member 220 had a temperature ranging from approximately 60° C. to approximately 65° C. Consequently, it was found that with the structure of the image processing sensor 1 described above, a design having a temperature difference between the first space portion S1 and the second space portion S2 is a difference of approximately 10° C. was achieved.

Figure 13:
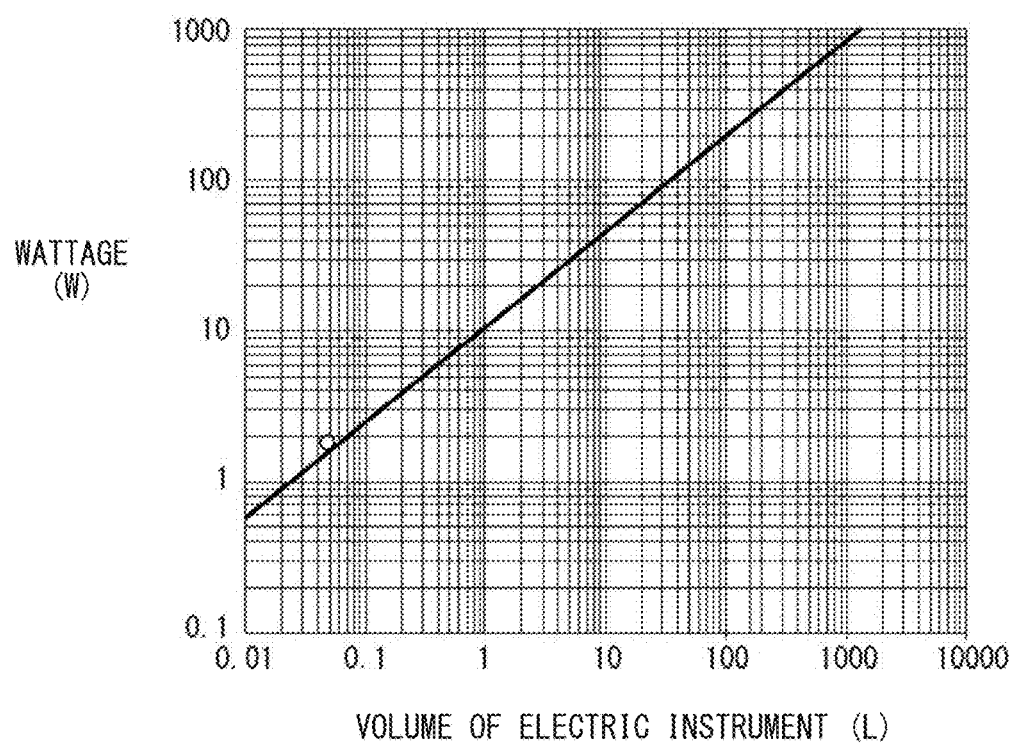
FIG. 13 is a graph illustrating a wattage-volume relationship of a commercially available electric instrument.

FIG. 13 is a graph illustrating a wattage-volume relationship of a commercially available electric instrument. In the graph illustrated in FIG. 13 a vertical axis indicates a wattage of the electric instrument and a lateral axis indicates a volume of the electric instrument. In the graph in FIG. 13, a thick solid line indicates a margin where a temperature rating of the electric instrument is satisfied by natural air cooling. For example, it is understood from the graph that the electric instrument satisfies the temperature rating by natural air cooling when the wattage-volume relationship of the electric instrument is in an area below the thick solid line. In contrast, it is understood from the graph that the electric instrument does not satisfy the temperature rating by natural air cooling when the wattage-volume relationship is in an area above the thick solid line. In this case, a forced air cooling using a fan or the like is required in order to satisfy the temperature rating of the electric instrument.

Here, as illustrated by a hollow circle in FIG. 13, the wattage-volume relationship of the image processing sensor 1 described above is in the area above the thick solid line. Therefore, when using the electric instrument which requires a wattage equivalent to that of the image processing sensor 1 with natural air cooling, the volume is essentially required to be increased. In contrast, in the image processing sensor 1, the amount of heat transferred from the first space portion S1 to the second space portion S2 is reduced, so that the temperature ratings of the components provided in the respective space portions are satisfied, respectively. Consequently, the image processing sensor 1 may use a larger wattage with lesser volume than the commercially available electric instrument, which enables miniaturization of the image processing sensor 1.

[5] Teaching Processing

Figure 14:
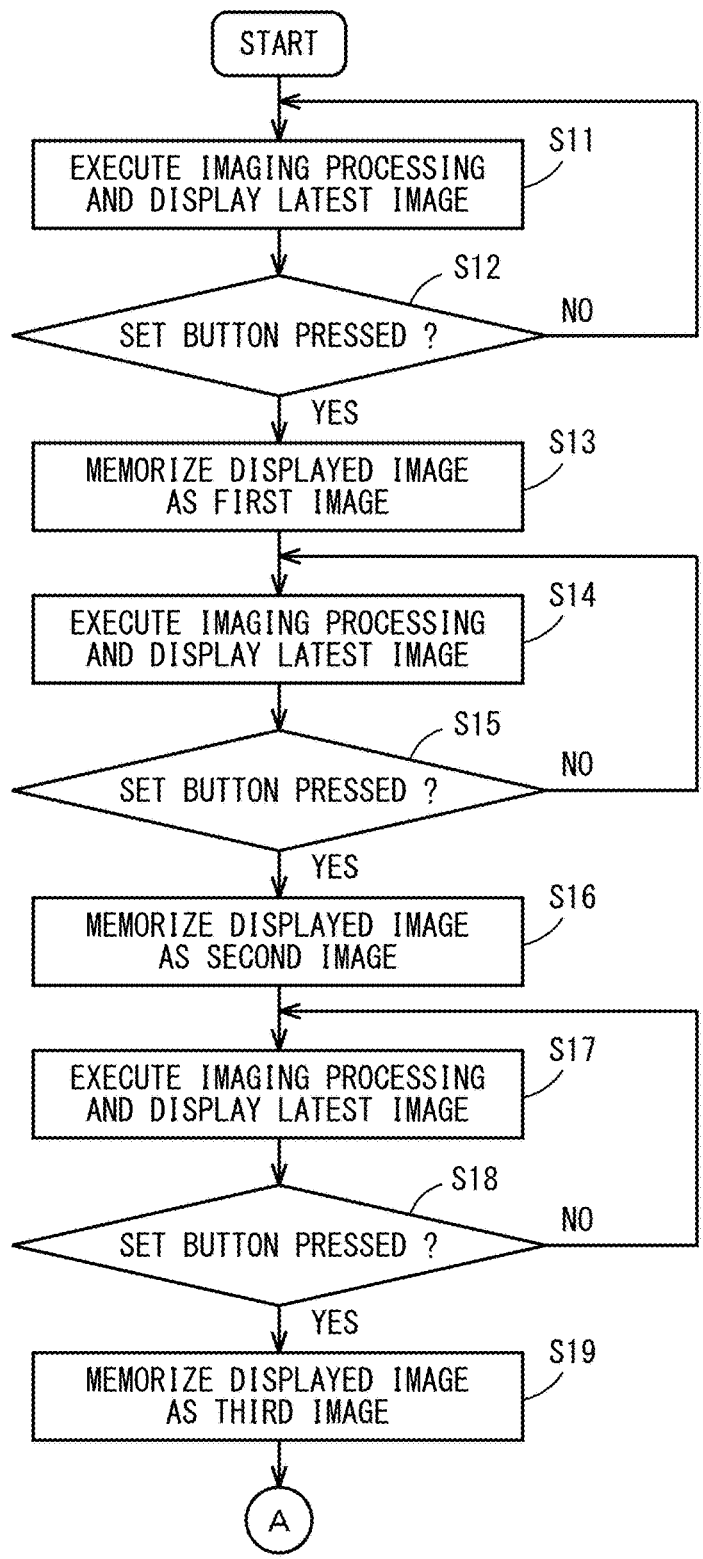
FIG. 14 is a flowchart of teaching processing in the image processing sensor.
Figure 15:
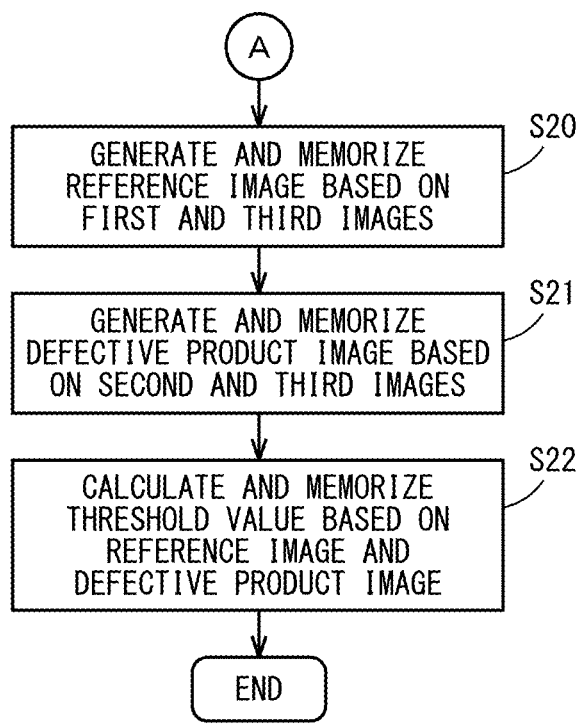
FIG. 15 is a flowchart of the teaching processing in the image processing sensor.
Figure 16A:
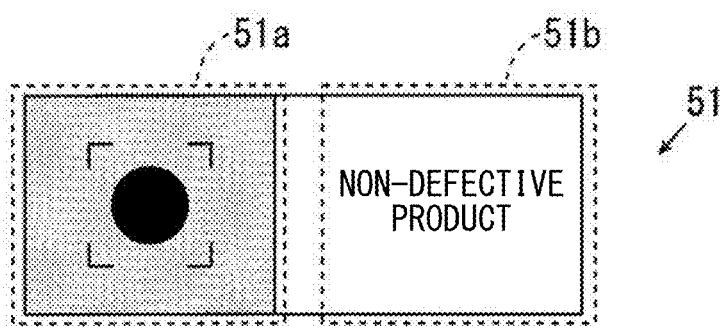
FIGS. 16A to 16C are drawings illustrating examples of images displayed on an image display panel during the teaching processing.
Figure 16B:
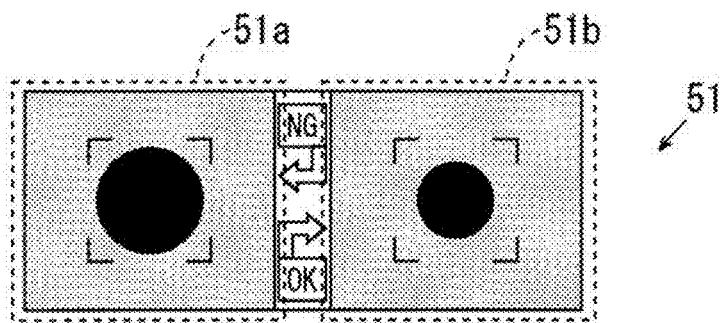
Figure 16C:
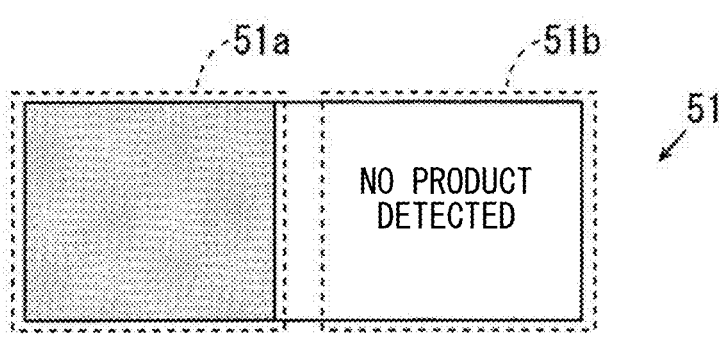

A flow of teaching processing in the image processing sensor 1 will be described along with a procedure of user operation. FIG. 14 and FIG. 15 are flowcharts of teaching processing performed in the image processing sensor 1. FIGS. 16A to 16C are drawings illustrating examples of images displayed on the image display panel 51 during the teaching processing. As described above, in the teaching processing, acquirement of a reference image and setting of a threshold value are performed. The reference image and the threshold value are used in determination display processing described later. The teaching processing is started by the user, for example, by pressing the set button 54a illustrated in FIG. 2 for a predetermined time (for example, 3 seconds) continuously.

In the following description, processing done by the DSP 32 for generating image data based on a digital signal provided by the imaging substrate 40 and memorizing the generated image data temporarily in the memory 33 illustrated in FIG. 1 is referred to as imaging processing. In the description given below, the term "background" corresponds, for example, to a member on which the target object W is placed. The background in the example illustrated in FIG. 1 is a surface of the belt conveyor BC.

The DSP 32 performs imaging processing and displays an image based on generated latest image data on the image display panel 51 (Step S11). The imaging processing started in Step S11 is performed at a certain cycle (for example, 3 msec) until processing in subsequent Step S13 is performed.

In this case, two display areas 51a and 51b are set on the image display panel 51 as illustrated in FIG. 16A. The image based on the latest image data is displayed on the display area 51a on the left side and a character string "non-defective product" is displayed on the display area 51b on the right side. In this state, the user adjusts a relative position between the image processing sensor 1 and the target object W so that a non-defective product having no defect is adequately displayed, and presses the set button 54a.

After the step S11, the DSP 32 determines whether or not the set button 54a has been pressed (Step S12). When the set button 54a is not pressed, the DSP 32 returns back to the process of Step S11. In contrast, when the set button 54a is pressed, the DSP 32 memorizes image data corresponding to a first image, which is the image displayed on the display area 51a, in the memory 33. In this example, the first image includes the target object W, which is a non-defective product, and the background.

Subsequently, the DSP 32 performs imaging processing and displays an image based on the generated latest image data on the image display panel 51 (Step S14). The imaging processing started in Step S14 is performed at a certain cycle (for example, 3 msec) until processing in subsequent Step S16 is performed.

In this case, the image based on the latest image data is displayed on the display area 51a on the left side and the first image is displayed on the display area 51b on the right side on the image display panel 51 as illustrated in FIG. 16B. In this state, the user adjusts a relative position between the image processing sensor 1 and the target object W so that a defective product having a defect is adequately displayed, and presses the set button 54a.

After the step S14, the DSP 32 determines whether or not the set button 54a is pressed (Step S15). When the set button 54a is not pressed, the DSP 32 returns back to the process of Step S14. In contrast, when the set button 54a is pressed, the DSP 32 memorizes image data corresponding to a second image, which is the image displayed on the display area 51a, in the memory 33 (Step S16). In this example, the second image includes the target object W, which is a defective product, and the background.

Subsequently, the DSP 32 performs imaging processing and displays an image based on the generated latest image data on the image display panel 51 (Step S17). The imaging processing started in Step S17 is performed at a certain cycle (for example, 3 msec) until processing in subsequent Step S19 is performed.

In this case, the image based on the latest image data is displayed on the display area 51a on the left side and a character string "no detected product" is displayed on the display area 51b on the right side on the image display panel 51 as illustrated in FIG. 16C. In this state, the user adjusts a relative position between the image processing sensor 1 and the target object W so that, for example, only the background is displayed, and presses the set button 54a.

After the step S17, the DSP 32 determines whether or not the set button 54a is pressed (Step S18). When the set button 54a is not pressed, the DSP 32 returns back to Step S17. In contrast, when the set button 54a is pressed, the DSP 32 memorizes image data corresponding to a third image, which is the image displayed on the display area 51a, in the memory 33. In this example, the third image is an image displaying only the background.

Subsequently, the DSP 32 generates the reference image based on the memorized image data of first and third images and memorizes the image data of the generated reference image in the memory 33 (Step S20). The reference image of this example is generated by subtracting brightness values of respective pixels of the third image from brightness values of respective pixels of the first image.

Subsequently, the DSP 32 generates the defective product image based on the memorized image data of second and third images and memorizes the image data of the generated defective product image in the memory 33 (Step S21). The defective product image of this example is generated by subtracting brightness values of respective pixels of the third image from brightness values of respective pixels of the second image.

Subsequently, the DSP 32 calculates a threshold value to be used in determination display processing based on the memorized image data of the reference image and image data of the defective product image, and memorizes the calculated threshold value in the memory 33 (Step S22).

The threshold value is set to a value between a matching degree of the reference image with respect to the reference image (highest value) and a matching degree of the defective product image with respect to the reference image. Specifically, when the highest value of the matching degree is 1000 and the matching degree of the defective product image is 700, the threshold value is set to, for example, 850.

According to the image processing sensor 1 of the embodiment, the user is capable of acquiring a desired reference image accurately and easily while confirming an image displayed on the image display panel 51 at the time of teaching. Therefore, adequate setting of the threshold value is enabled.

[6] Determination Display Processing

Figure 17:
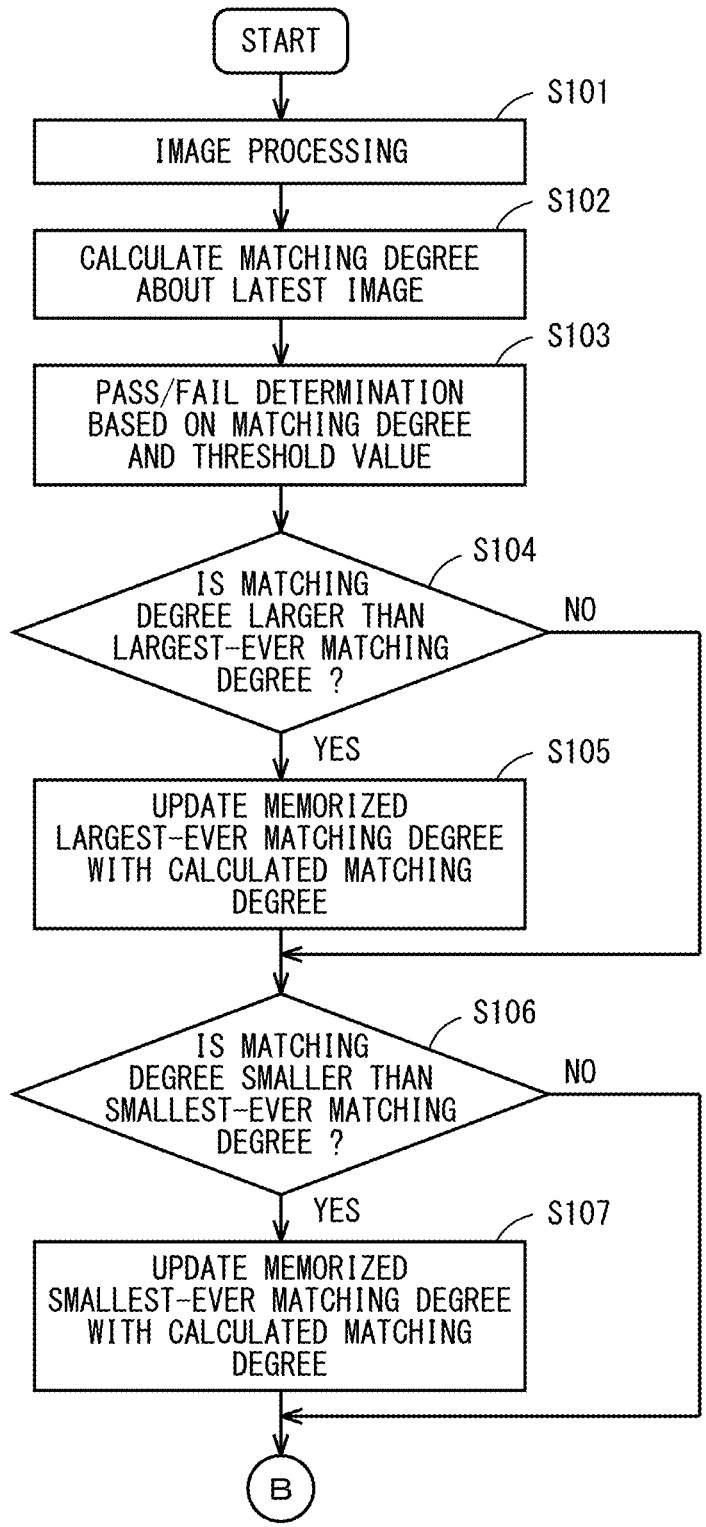
FIG. 17 is a flowchart of determination display processing in the image processing sensor.
Figure 18:
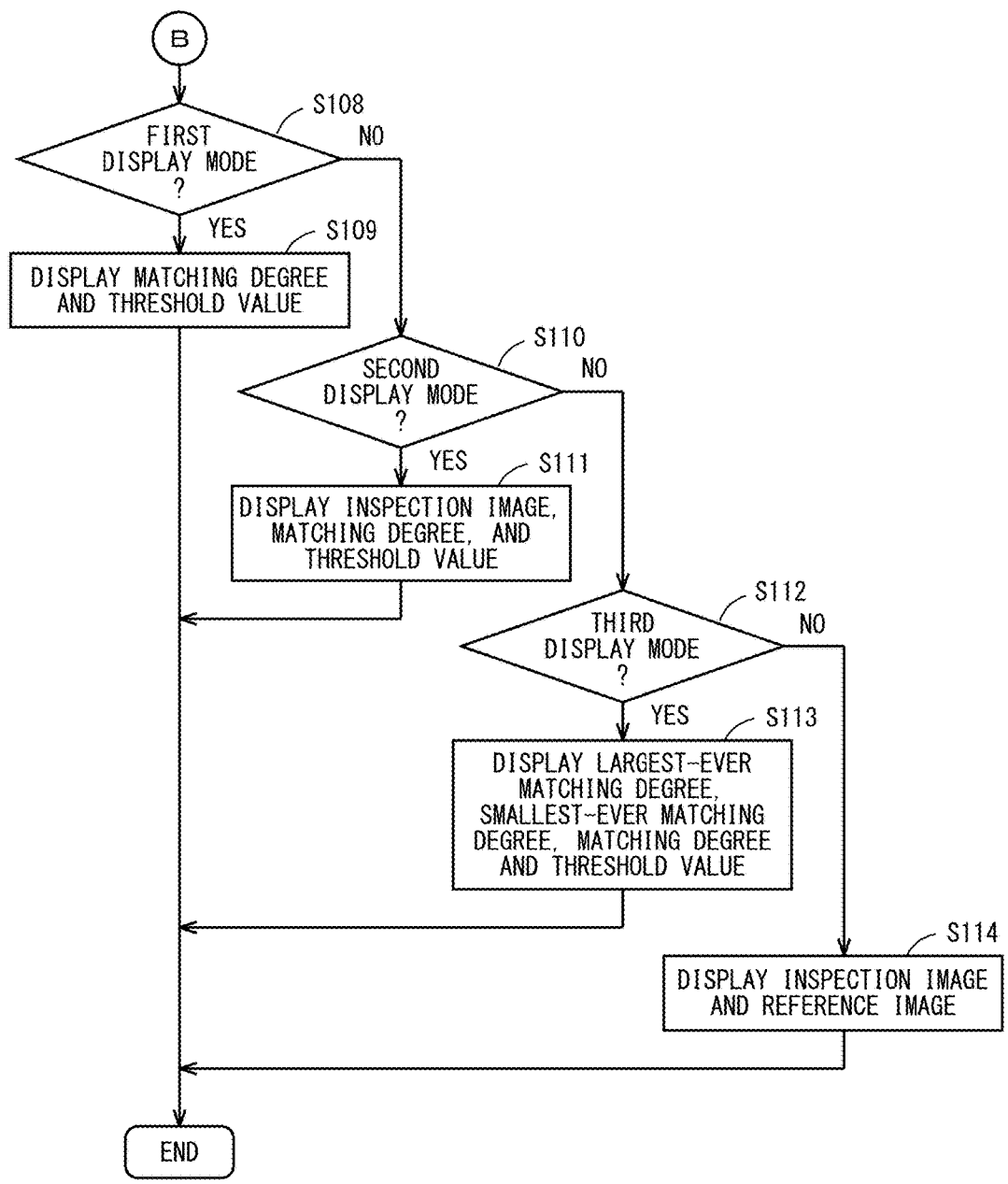
FIG. 18 is a flowchart of the determination display processing in the image processing sensor.

FIG. 17 and FIG. 18 are flowcharts of the determination display processing in the image processing sensor 1. In the following description, the image processing sensor 1 is assumed to be disposed at a position where imaging of the inspection area IA in FIG. 1 is enabled. After the threshold value is set by the above-described teaching processing for example, the determination display processing is performed at a constant cycle (for example, 3 msec) while the target object W to be conveyed by the belt conveyor BC stays in the inspection area IA.

The DSP 32 performs imaging processing (Step S101), then calculates a matching degree based on the latest image data generated by the imaging processing and the image data of the reference image memorized in the memory 33 (Step S102).

Specifically, the DSP 32 generates an inspection image by subtracting brightness values of the respective pixels of the third image (the image of only the background) from the brightness values of the respective pixels of the latest image (the image including the target object W and the background), and calculates the matching degree with respect to the reference image about the generated inspection image.

Subsequently, the DSP 32 performs pass/fail determination of the target object W appearing in the latest image based on the calculated matching degree and the threshold value memorized in the memory 33 (Step S103). The determination result is supplied to the MCU 31 in FIG. 1.

In the image processing sensor 1 of this example, a maximum value and a minimum value out of the matching degree calculated in a period from a time point when the last teaching processing is performed to the present are memorized in the memory 33 as a largest-ever matching degree and a smallest-ever matching degree respectively. In the memory 33, the largest-ever matching degree and the smallest-ever matching degree are reset, for example, every time when the teaching processing is performed.

Accordingly, the DSP 32 determines whether or not the matching degree calculated in the process of Step S102 is larger than the largest-ever matching degree memorized in the memory 33 (Step S104). When the calculated matching degree is larger than the largest-ever matching degree, the DSP 32 updates the largest-ever matching degree memorized in the memory 33 with the calculated matching degree (Step S105). In contrast, when the calculated matching degree is not larger than the largest-ever matching degree, the DSP 32 goes to a process in the following step S106. Accordingly, the largest-ever matching degree memorized in the memory 33 is maintained.

Subsequently, the DSP 32 determines whether or not the matching degree calculated in the process of Step S102 is smaller than the smallest-ever matching degree memorized in the memory 33 (Step S106). When the calculated matching degree is smaller than the smallest-ever matching degree, the DSP 32 updates the smallest-ever matching degree memorized in the memory 33 with the calculated matching degree (Step S107). In contrast, when the calculated matching degree is not smaller than the smallest-ever matching degree, the DSP 32 goes to a process in the following step S108. Accordingly, the smallest-ever matching degree memorized in the memory 33 is maintained.

In the image processing sensor 1 of the example, information on pass/fail determination of the target object W is displayed on the image display panel 51 in first, second, third and fourth display modes when the determination display processing is performed. The user is allowed to select a display mode of the image display panel 51, for example, by switching the mode in sequence by pressing the switch button 54e in FIG. 2 repeatedly.

Accordingly, after the process in Step S107, the DSP 32 determines whether or not the first display mode is selected (Step S108). If the first display mode is selected, the DSP 32 issues a command to the MCU 31 to display the matching degree calculated in Step S102 and the threshold value memorized in the memory 33 on the image display panel 51 (Step S109), and terminates the determination display processing.

When the first display mode is not selected, the DSP 32 determines whether or not the second display mode is selected (Step S110). When the second display mode is selected, the DSP 32 issues a command to the MCU 31 to display the inspection image (the latest image), the calculated matching degree and the threshold value on the image display panel 51 (Step S111), then the determination display processing terminates.

When the second display mode is not selected, the DSP 32 determines whether or not the third display mode is selected (Step S112). When the third display mode is selected, the DSP 32 issues a command to the MCU 31 to display the largest-ever matching degree, the smallest-ever matching degree, the calculated matching degree and the threshold value on the image display panel 51 (Step S113), then the determination display processing terminates.

When the third display mode is not selected, that is, when the fourth display mode is selected, the DSP 32 issues a command to the MCU 31 to display the inspection image (the latest image) and the reference image on the image display panel 51 (Step S114), then the determination display processing terminates.

The DSP 32 may change a preset threshold value in response to the operation of the up button 54b or the down button 54c in FIG. 2 by the user during the determination display processing. The DSP 32 may return a process to be performed to one step before in response to the operation of the return button 54d in FIG. 2 by the user.

[7] the Display Mode of the Image Display Panel During the Determination Display Processing As described above, in the image processing sensor 1, information on pass/fail determination of the target object W is displayed on the image display panel 51 in the first, second, third and fourth display modes. FIGS. 19A to 19D are drawings illustrating the first, second, third and fourth display modes of the image display panel 51. FIGS. 19A, 19B, 19C and 19D illustrate the first, second, third, and fourth display modes. In the determination display processing as well, the two display areas 51a and 51b are set on the image display panel 51 in the same manner as the teaching processing.

Figure 19A:
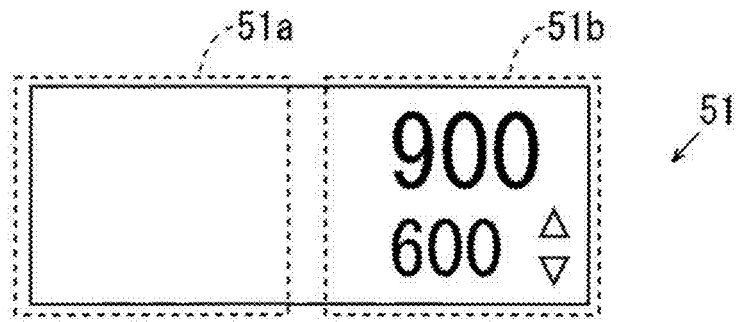
FIGS. 19A to 19D are drawings illustrating first, second, third and fourth display modes of an image display panel.

As illustrated in FIG. 19A, in the first display mode, for example, the calculated matching degree and the threshold value are displayed in an upper portion and a lower portion, respectively, of the display area 51b on the right side.

Figure 19B:
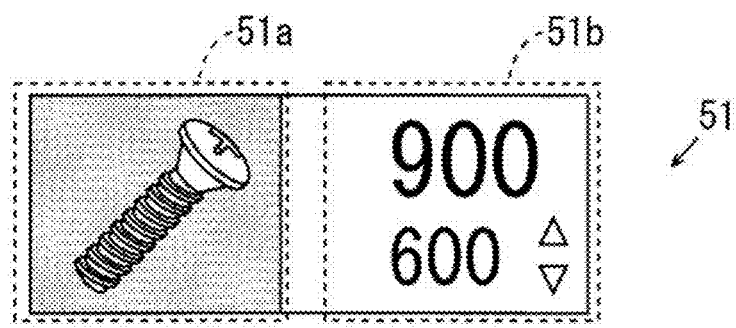

As illustrated in FIG. 19B, in the second display mode, for example, the inspection image is displayed in the display area 51a on the left side. The calculated matching degree and the threshold value are displayed in the upper portion and the lower portion, respectively, of the display area 51b on the right side.

Figure 19C:
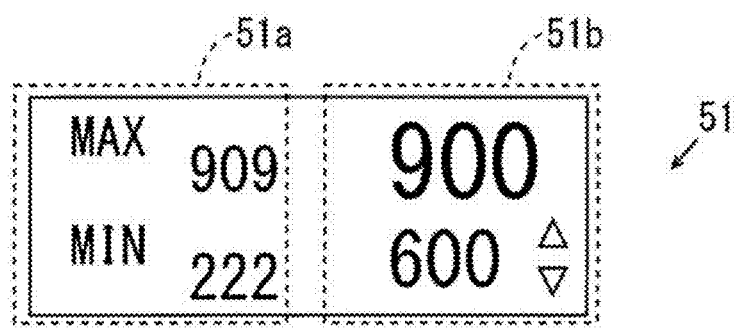

As illustrated in FIG. 19C, in the third display mode, for example, the largest-ever matching degree and the smallest-ever matching degree are displayed in the upper portion and the lower portion, respectively, of the display area 51a on the left side. The calculated matching degree and the threshold value are displayed in the upper portion and the lower portion, respectively, of the display area 51b on the right side.

Figure 19D:
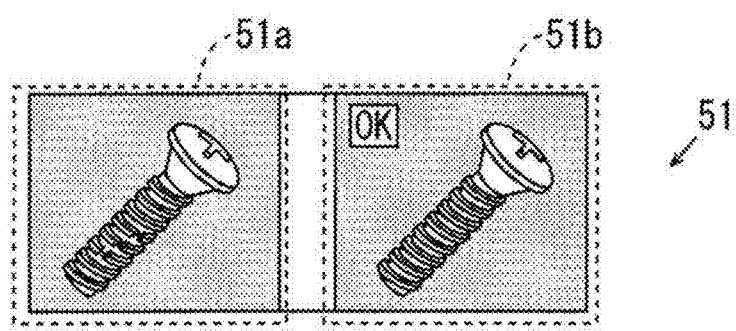

As illustrated in FIG. 19D, in the fourth display mode, for example, the inspection image is displayed in the display area 51a on the left side. The reference image is displayed in the display area 51b on the right side.

According to the image processing sensor 1 of the embodiment, the user is capable of confirming an image displayed on the image display panel 51 at the time of pass/fail determination of the target object W as well. Accordingly, whether or not pass/fail determination of the target object W is performed accurately may be confirmed easily.

[8] Other Embodiment (1) In the embodiment described above, the heat-insulating wall 235 that divides the internal space S of the casing 200 into the first space portion S1 and the second space portion S2 is provided integrally with the coupling casing member 230. However, the invention is not limited thereto.

The heat-insulating wall 235 may be provided separately from the front wall 231, the rear wall 232, the one side wall 233, and the other side wall 234 of the coupling casing member 230. In this case, a material different from the resin material of the coupling casing member 230 is used as the material of the heat-insulating wall 235.

(2) In the embodiment described above, the second casing member 220 is formed of a plate member. However, the invention is not limited thereto. The second casing member 220 may have a configuration including a front wall, a rear wall, one side wall, other side wall, and a bottom wall (a ceiling wall) in the same manner as the first casing member 210.

(3) In the embodiment described above, the coupling casing member 230 is coupled to the first casing member 210 and the second casing member 220, respectively. However, the invention is not limited thereto.

Other members may be interposed between the first casing member 210 and the coupling casing member 230. For example, a gasket for securing sealing property in the casing 200 may be provided between the first casing member 210 and the coupling casing member 230.

Other members may be interposed between the second casing member 220 and the coupling casing member 230. For example, a gasket for securing sealing property in the casing 200 may be provided between the second casing member 220 and the coupling casing member 230.

(4) In the embodiment described above, the first casing member 210 includes the front wall 211, the rear wall 212, the one side wall 213, and the other side wall 214 as peripheral walls that surround part (the first space portion S1) of the internal space S. The coupling casing member 230 includes the front wall 231, the rear wall 232, the one side wall 233, and the other side wall 234 as peripheral walls that surround part (the first space portion S1 and the second space portion S2) of the internal space S. The invention is not limited to the example described above.

For example, each of the first casing member 210 and the coupling casing member 230 may have a wall having a circular shape in cross section as the peripheral walls that surround part of the internal space S or may have a wall having an oval shape in cross section.

(5) In the embodiment described above, after the reference image and the defective product image have been generated based on the first, second, and third images in the teaching processing, the threshold value is calculated based on the reference image and the defective product image. However, the invention is not limited thereto.

Figure 20:
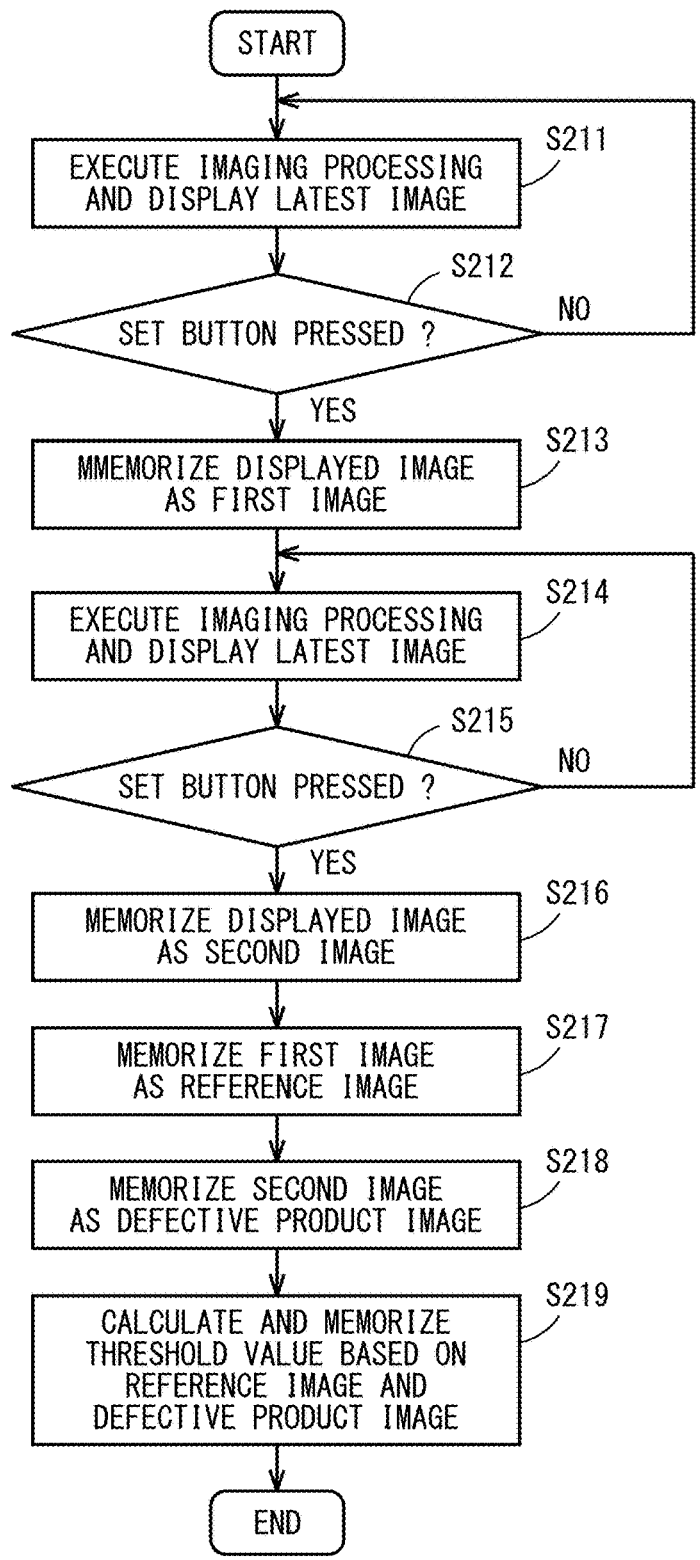
FIG. 20 is a flowchart of teaching processing according to another embodiment.

The reference image and the defective product image may be generated based on two images. FIG. 20 is a flowchart of teaching processing according to another embodiment. In the teaching processing in FIG. 20, the process of Steps S211 to S216 is performed in the same manner as the Steps S11 to S16 in FIG. 14. Accordingly, at the time point when Step S216 terminates, image data of the first and second images is memorized in the memory 33.

Subsequently, the DSP 32 determines the memorized first image as a reference image, and memorizes image data of the reference image in the memory 33 (Step S217). The DSP 32 determines the memorized second image as a defective product image, and memorizes image data of the defective product image in the memory 33 (Step S218).

Subsequently, the DSP 32 calculates a threshold value to be used in determination display processing based on the memorized image data of the reference image and image data of the defective product image, and memorizes the calculated threshold value in the memory 33 (Step S219). In this example as well, the threshold value is set to a value between a matching degree of the reference image with respect to the reference image (highest value) and a matching degree of the defective product image with respect to the reference image.

When a threshold value is set by the teaching processing in FIG. 20, the DSP 32 specifies the latest image (an image including the target object W and the background) as an inspection image, and calculates matching degree of the inspection image with respect to the reference image in Step S102 in FIG. 17. The DSP 32 performs the pass/fail determination on the target object W appearing in the latest image based on the calculated matching degree and the threshold value memorized in the memory 33 (Step S103).

In this manner, when the reference image and the defective product image are generated based on the two images, the setting operation of the threshold value by the user is simplified.

(6) In the embodiment described above, the matching degree is used as an evaluation value in the pass/fail determination of the target object W based on the reference image. However, the invention is not limited thereto. A sum value of the brightness values of all the pixels may be used or, alternatively, an average value of the brightness values of all the pixels may be used as an evaluation value for the pass/fail determination on the target object W instead of the matching degree described above. In this case, by setting the threshold value corresponding to a value used as the evaluation value, the pass/fail determination based on the set threshold value and the inspection image may be performed.

(7) In the embodiment described above, the plurality of screws SC1 formed of a metal are used for coupling the first casing member 210 and the coupling casing member 230. However, the invention is not limited thereto. As a configuration for coupling the first casing member 210 and the coupling casing member 230, a plurality of screws formed of a resin may be used or a plurality of rivets formed of a metal may be used instead of the plurality of screws SC1 formed of a metal.

(8) In the embodiment described above, the plurality of screws SC2 formed of a metal are used for coupling the second casing member 220 and the coupling casing member 230. However, the invention is not limited thereto. As a configuration for coupling the second casing member 220 and the coupling casing member 230, the plurality of screws formed of a resin may be used or the plurality of rivets formed of a metal may be used instead of the plurality of screws SC2 formed of a metal.

[9] Reference Embodiment (1) An image processing sensor of a reference embodiment is the image processing sensor 1 of the above-described embodiment having no heat-shielding wall 235. For example, when heat transferred from the first casing member 210 through the coupling casing member 230 and the second casing member 220 to the display substrate 50 is sufficiently reduced and heat radiating properties of the first casing member 210 is secured, the configuration of the image processing sensor 1 may be simplified by not being provided with the heat-insulating wall 235.

When the heat-insulating wall 235 is not provided, a boundary between the first space portion S1 and the second space portion S2 may be defined at a given position between the lower end portion of the coupling casing member 230 and the upper end portion of the coupling casing member 230.

(2) In the embodiment described above, the display substrate 50 is mounted on the lower surface of the second casing member 220, so that the image display panel 51 is housed in the interior of the second space portion S2. In contrast, in the image processing sensor of the reference embodiment, the image display panel 51 is provided on the upper surface of the second casing member 220. In this case, assembly of the image processing sensor is facilitated.

[10] Correspondence Between Respective Components in Claims and Respective Elements in the Embodiment Examples of correspondence between the respective components of Claims and the respective elements of the embodiment will be described. However, the invention is not limited to the examples given below.

In the embodiment described above, the target object W is an example of the target object, the illumination substrate 20 is an example of the illumination unit, the imaging substrate 40 is an example of the imaging unit, the display substrate 50 is an example of the display unit, the internal space S is an example of the internal space, the casing 200 is an example of the casing, and the image processing sensor 1 is an example of the image processing sensor.

The first casing member 210 is an example of the first casing member, the bottom wall 215 of the first casing member 210 is an example of the bottom portion of the first casing member, the front wall 211, the rear wall 212, the one side wall 213, and the other side wall 214 of the first casing member 210 are examples of the first side surface of the first casing member.

The second casing member 220 is an example of the second casing member, the opening 221 of the second casing member 220 and the transparent cover member 222 provided in the opening 221 are an example of the display window, the coupling casing member 230 is an example of the third casing member, and the front wall 231, the rear wall 232, the one side wall 233, and the other side wall 234 of the coupling casing member 230 are examples of the second side surface of the third casing member.

The first space portion S1 is an example of the first space portion, the second space portion S2 is an example of the second space portion, the heat-insulating wall 235 of the coupling casing member 230 is an example of a space partitioning portion, the direction parallel to the Z-direction is an example of the direction substantially orthogonal to the bottom surface portion of the first casing member, the direction parallel to the XY-direction is an example of the direction parallel to the bottom portion of the first casing member, the wiring members L1 and L2 are examples of the cables, and the openings 235a and 235b of the heat-insulating wall 235 are examples of the cable openings of the space partitioning portion.

An outer peripheral surface formed of the front wall 211, the rear wall 212, the one side wall 213, and the other side wall 214 of the first casing member 210 and an outer peripheral surface formed of the front wall 231, the rear wall 232, the one side wall 233, and the other side wall 234 of the coupling casing member 230 are examples of an outer peripheral surface of the casing.

The cover member 216b provided on the bottom wall 215 is an example of a first light-transmitting portion, the cover member 216a provided on the bottom wall 215 is an example of a second light-transmitting portion, and flat outer surfaces of the front wall 211, the one side wall 213, and the other side wall 214 of the first casing member 210 are examples of the mounting surface.

The plurality of screws SC1 are an example of a first fastening member, the plurality of screws SC2 are an example of a second fastening member, the main substrate 30 is an example of the processing unit, the operation unit 54 is an example of the operation unit, and the threshold value for performing pass/fail determination of the target object W is an example of a determination threshold value.

Other various element having configuration or functions described in Claims may be used as the respective components of Claims.

The invention can be effectively utilized in various image processing sensors.

What is claimed is:

1. An image processing sensor comprising:
   an illumination unit that illuminates a target object;
   an imaging unit that images the target object illuminated by the illumination unit;
   a display unit that displays an image of the target object acquired by the imaging unit; and
   a casing having an internal space that houses the illumination unit, the imaging unit, and the display unit, wherein pass/fail determination of the target object is performed by processing the image of the target object acquired by the imaging unit,
   wherein the casing includes:
      a first casing member having a bottom portion and a first side surface that extends in a direction substantially orthogonal to the bottom portion so as to surround an outer peripheral edge portion of the bottom portion, the first casing member housing the illumination unit and the imaging unit, the bottom portion having an opening, and the imaging unit positioned so as to face the opening;
      a second casing member provided with a display window that allows visual check of a display screen of the display unit from outside; and
      a third casing member having a second side surface that extends in a direction substantially orthogonal to the bottom portion of the first casing member,
   wherein the second side surface of the third casing member is coupled to an upper surface of the first side surface of the first casing member,
   wherein the second casing member is coupled to an upper surface of the second side surface of the third casing member,
   wherein the third casing member includes a space partitioning portion formed substantially parallel to the bottom portion of the first casing member so as to divide the internal space into two parts; a first space portion that houses the illumination unit and the imaging unit and a second space portion that houses the display unit, and
   wherein heat conductivity of each of the second side surface of the third casing member and the space partitioning portion is lower than a heat conductivity of the first casing member.

2. The image processing sensor according to claim 1, wherein the space partitioning portion divides and partitions a space defined inside the annular second side surface into two parts in a vertical direction.

3. The image processing sensor according to claim 1, wherein a cross section of the first side surface that extends along a direction parallel to the bottom portion of the first casing member has a shape that is substantially of a same shape as a cross section of the second side surface that extends along the direction parallel to the bottom portion of the first casing member.

4. The image processing sensor according to claim 1, wherein the second side surface is formed with a material and the space partitioning portion is formed integrally with the second side surface with a material of a same type as the material of the second side surface.

5. The image processing sensor according to claim 1, wherein the space partitioning portion has a cable opening which allows insertion of a cable for transmitting an image signal for displaying the image acquired by the imaging unit on the display unit.

6. The image processing sensor according to claim 1, wherein the display unit is provided on a lower surface of the second casing member.

7. The image processing sensor according to claim 1, wherein a thickness of a part of the second side surface of the third casing member is smaller than a thickness of other parts of the second side surface.

8. The image processing sensor according to claim 1, wherein an outer peripheral surface of the first side surface of the first casing member and an outer peripheral surface of the second side surface of the third casing member constitute an outer peripheral surface of the casing.

9. The image processing sensor according to claim 1, wherein a first light-transmitting portion that transmits light emitted from the illumination unit and a second light-transmitting portion that transmits light incoming into the imaging unit are provided on the bottom portion of the first casing member.

10. The image processing sensor according to claim 1, wherein the first casing member includes a mounting surface for mounting the image processing sensor on a flat installation surface, an upper end portion of the second side surface is formed being offset inward with respect to the mounting surface of the first casing member so that at least the upper end portion of the second side surface is disposed at a position separate from the installation surface when the first casing member is mounted on the installation surface via the mounting surface thereof.

11. The image processing sensor according to claim 1, further comprising a first fastening member that fastens the first casing member and the third casing member, and a second fastening member that fastens the second casing member and the third casing member, wherein the first fastening member and the second fastening member are provided at such positions that the both do not contact each other.

12. The image processing sensor according to claim 1, wherein the first casing member houses a processing unit that performs the pass/fail determination of the target object based on the image of the target object acquired by the imaging unit.

13. The image processing sensor according to claim 12, further comprising an operation unit which is operated by a user,
wherein the processing unit
acquires a reference image that serves as criteria for the pass/fail determination of the target object based on an operation of the operation unit by the user at the time of teaching, sets a determination threshold value for the pass/fail determination of the target object based on a matching degree between the reference image and the image acquired by the imaging unit,
calculates the matching degree between the image acquired by the imaging unit and the reference image at the time of pass/fail determination of the target object, and performs the pass/fail determination of the target object based on the calculated matching degree and the determination threshold value set at the time of teaching.

\* \* \* \* \*